US008265376B2

(12) United States Patent
Tsuk et al.

(10) Patent No.: US 8,265,376 B2
(45) Date of Patent: Sep. 11, 2012

(54) METHOD AND SYSTEM FOR PROVIDING A DIGITAL MODEL OF AN OBJECT

(75) Inventors: Nir Tsuk, Tel Aviv (IL); Tamir Shalom, Tel Aviv (IL)

(73) Assignee: Cognitens Ltd., Ramat Hasharon (IL)

( * ) Notice: Subject to any disclaimer, the term of this patent is extended or adjusted under 35 U.S.C. 154(b) by 920 days.

(21) Appl. No.: 12/318,383

(22) Filed: Dec. 29, 2008

(65) Prior Publication Data

US 2010/0017178 A1 Jan. 21, 2010

Related U.S. Application Data

(60) Provisional application No. 61/129,807, filed on Jul. 21, 2008.

(51) Int. Cl.
*G06K 9/00* (2006.01)
*G06K 9/34* (2006.01)
(52) U.S. Cl. ........................ 382/154; 382/176
(58) Field of Classification Search ...... 703/6; 382/276, 382/154
See application file for complete search history.

(56) References Cited

U.S. PATENT DOCUMENTS

| | | | | |
|---|---|---|---|---|
| 5,821,943 | A * | 10/1998 | Shashua | 345/427 |
| 6,201,541 | B1 * | 3/2001 | Shalom et al. | 345/419 |
| 6,438,263 | B2 * | 8/2002 | Albeck et al. | 382/154 |
| 6,556,705 | B1 * | 4/2003 | Shalom | 382/154 |
| 7,256,899 | B1 | 8/2007 | Faul et al. | |
| 7,693,325 | B2 * | 4/2010 | Pulla et al. | 382/154 |
| 7,750,969 | B2 * | 7/2010 | Sato et al. | 348/335 |

(Continued)

FOREIGN PATENT DOCUMENTS

EP 1 657 678 A1 5/2006

(Continued)

OTHER PUBLICATIONS

Xiong et al. "Meeting Room Configuration and Multiple Camera Calibration in Meeting Analysis", ACM, $7^{th}$ Internation Conference on Multimodal Interfaces, Oct. 2005, 8 pages.*

*Primary Examiner* — S Lo
(74) *Attorney, Agent, or Firm* — Vorys, Sater, Seymour and Pease LLP; Susanne M. Hopkins; William L. Klima

(57) ABSTRACT

Methods and systems are provided for generating a digital model of at least a part of an object referenced to a global coordinate system. An initial digital model, referenced to a local coordinate system associated with the optical device and representative of the respective part, is provided using an optical device at a relative location with respect to the object. The optical device has a plurality of visually exposed optical markers, at known locations with respect to the optical device and referenced to a marker coordinate system. The location of the optical device with respect to an external camera arrangement is determined, based on relating the relative locations of the markers with respect to one another, as they appear from a viewpoint of the external camera arrangement, to their relative locations as referenced to the marker coordinate system. The camera viewpoint is at a known location referenced to the global coordinate system. A transformed digital model is generated, representative of the respective part and referenced to the global coordinate system, based on modifying the initial digital model according to the location of the optical device.

24 Claims, 12 Drawing Sheets

U.S. PATENT DOCUMENTS

| | | | |
|---|---|---|---|
| 8,044,991 B2 * | 10/2011 | Lea et al. | 348/25 |
| 2002/0100884 A1 | 8/2002 | Maddock | |
| 2004/0196451 A1 | 10/2004 | Aoyama | |
| 2006/0227133 A1 * | 10/2006 | Petrov et al. | 345/419 |
| 2008/0192263 A1 * | 8/2008 | Wienand et al. | 356/614 |
| 2008/0239327 A1 * | 10/2008 | Bryll | 356/623 |

FOREIGN PATENT DOCUMENTS

| | | |
|---|---|---|
| EP | 1 711 777 B1 | 10/2006 |
| JP | 4077755 B2 | 11/2004 |
| WO | 92/07233 A1 | 4/1992 |
| WO | 2007/030026 A1 | 3/2007 |

\* cited by examiner

METHOD AND SYSTEM FOR PROVIDING A DIGITAL MODEL OF AN OBJECT

This is a Non-Provisional Application of U.S. Provisional Patent Application Ser. No. 61/129,807, filed on Jul. 21, 2008, the entire content of which is hereby incorporated by reference in its entirety.

FIELD OF THE INVENTION

This invention relates to methods and systems for reconstructing digital models of objects.

BACKGROUND OF THE INVENTION 3D measurement of objects is well known and finds use in many applications in industry for example.

By way of general background, the following publications disclose measurement systems.

US 2008/192263 (EP 1711777) discloses a method for determining the position of an object in space, in which measurement characteristics of the object are recorded with an optical recording device calibrated to a space coordinate system, and on the basis of these measurement characteristics, the position of the object in the space coordinate system is determined in an image processing device. To enable reliable ascertainment of the position even with only a few recording devices, it is provided that at least two measurement characteristics of the object are detected simultaneously in a recording device and used to determine the position of the object.

US 2004/196451 (JP 4077755) discloses a method for measuring a position of an object according to an image of the object captured by a camera unit. The method includes the following steps: calculating a discrepancy of an incident beam of light penetrating a lens system of the camera unit relative to an optical center of the lens system, and compensating the position of the object according to the discrepancy.

US 2002/100884 discloses an optical method for determining the spatial coordinates of a surface, comprising scanning the surface with an incident beam of light from a scanner head, determining the range to the surface at a plurality of points on the surface relative to the scanner head by a means of a return beam reflected from the surface, determining the relative spatial location and orientation of the scanner head at the time of scanning each of said plurality of surface points by a remote optical sensing system that includes a plurality of positioning sensors each located at a different known location relative to the other positioning sensors and a plurality of markers attached to the scanner head, with each marker at a at different location relative to the other markers. The colors of a target surface may be measured together with the surface spatial coordinates by an optical method comprising the scanning of the surface with an incident beam of laser light from an optical parametric oscillator tuned so that the beam contains at least one well defined wavelength, determining the spatial coordinates of the surface at a plurality of points by means of a return beam reflected from the surface, measuring the intensity of the reflected laser light at each of said points on the surface, tuning the optical parametric oscillator to a plurality of different discrete wavelengths and repeating the measurements of surface spatial coordinates and reflectance intensities for each of these new wavelengths, and combining the reflectance intensities measured at these different wavelengths at each surface point into a multi-channel composite that expresses the coloration of the surface.

SUMMARY OF THE INVENTION

Herein the terms "position" and "location" are interchangeably taken to refer to the spatial position and/or orientation.

Herein the term "object" includes anyone of or combination of an object, part of an object, collection of objects and or a scene.

According to a first aspect of the invention, there is provided a method for providing or generating a digital model of at least a part of an object referenced to a global coordinate system, comprising, for the or each said part:

(a) providing an initial digital model representative of the respective part using an optical device at a respective relative location with respect to said object, wherein said initial digital model is referenced to a local coordinate system associated with said optical device, and wherein said optical device comprises a plurality of visually exposed optical markers, said markers being located at known locations with respect to said optical device referenced to a marker coordinate system;

(b) determining said location of the optical device in step (a) with respect to an external camera arrangement, based on relating the relative locations of said markers with respect to one another, as they appear from a viewpoint of said external camera arrangement, to the relative locations of respective said markers with respect to one another as referenced to said marker coordinate system, and wherein said viewpoint is at a known location referenced to said global coordinate system; and (c) generating a transformed digital model representative of the respective part and referenced to said global coordinate system, based on modifying said initial digital model according to said determined location.

In some embodiments said visually exposed markers are detectable by said camera arrangement, at least in position, in the visible electromagnetic spectrum, though in other embodiments the markers may be visible with respect to the camera arrangement, additionally or alternatively, in the UV or IR wavelengths of the electromagnetic spectrum, and/or beyond these wavelengths.

Steps (a) to (c) may be repeated a plurality of times, wherein each said time said optical device is at a different said respective relative location with respect to said object and a respective modified digital model being generated of a different respective said part of said object, thereby generating a corresponding plurality of said modified digital models, and further comprising the step of combining said modified digital models thus generated into a unified digital model.

For example, the initial digital model(s) for each respective part may be generated by applying any one of triangulation, epipolar or confocal techniques to said part using said optical device.

A camera coordinate system is associated with said camera arrangement corresponding to said viewpoint when said optical device is at said respective relative location with respect to said object. In step (c), a transformation matrix $T_i$ may be applied to said initial digital model, wherein said transformation matrix $T_i$ is configured for converting coordinates of said digital model from the local coordinate system to coordinates referenced to said global coordinate system, to provide said transformed digital model, wherein said transformation matrix $T_i$ is obtained from transformation relationship:

$$A = T_i * B * S_i$$

wherein:

A is a known transformation matrix between the camera coordinate system and the global coordinate system;

B is a known transformation matrix between the markers coordinate system and the local coordinate system;

$S_i$ is a transformation matrix between the camera coordinate system and the marker coordinate system, determined based on said determination of said location in step (b).

In at least one embodiment, the method may comprise the following steps:

Step 701~providing camera so that markers on optical device are within field of view of camera;

Step 705~providing a relative disposition between optical device and object—position $P_i$;

Step 710~creating a digital model $DM_i$ of part $O_i$ of the object referenced to the local coordinate system of the optical device at position $P_i$;

Step 720~acquiring a 2D image of the markers on optical device, and estimating the relative position of the markers with respect to the camera coordinate system from the 2D image;

Step 730~generating a digital model $M_i$ corresponding to digital model $DM_i$ of part $O_i$ of the object, referenced to the global coordinate system;

Step 740~repeating steps 710, 720, 730 a number of times, changing the position each time between the optical device and the object;

Step 750~combining digital models $M_i$ to provide a combined digital model of the scanned areas of the object.

The matrix A may be determined based on said known location of said viewpoint with respect to said global coordinate system, or alternatively matrix A may be determined based on executing a suitable calibration procedure in which said method is applied to a suitable calibration object. Matrix B may be determined via a suitable calibration procedure in which said method is applied to a suitable calibration object.

Such a calibration procedure for obtaining matrix A and/or matrix B may comprise, for example the following steps:

Step 651~providing a calibration object with targets in known spatial relationship to one another, referenced to global coordinate system;

Step 652~providing camera system so that markers on optical device are within field of view of camera;

Step 653~providing a relative disposition between optical device and calibration object;

Step 654~creating a digital model of at least a portion of the targets, referenced to the local coordinate system of the optical device at a position;

Step 655~determining matrix $T_i$ corresponding to this position;

Step 656~acquiring a 2D image of the markers on optical device, and estimating the relative position of the markers with respect to the camera coordinate system from the 2D image;

Step 657~determining matrix $S_i$ corresponding to the position;

Step 658~repeat steps 654, 655, 656, 657 a number of times, changing the position each time between the optical device and the calibration object;

Step 659~determining transformation matrices A and B.

An alternative embodiment of the calibration procedure comprises the following steps:

Step 651'~providing calibration object with targets in known spatial relationship to one another, referenced to global coordinate system;

Step 652'~providing camera so that markers on optical device are within field of view of camera;

Step 653'~providing a relative disposition between optical device and calibration object~position $Q_i$;

Step 654'~creating a digital model $CM_i$ of at least a portion of the targets, referenced to the local coordinate system $LCS_i$ of the optical device at position $Q_i$;

Step 655'~determining matrix $T_i$ corresponding to position $Q_i$;

Step 656'~acquiring a 2D image of the markers on optical device, and estimating the relative position of the markers with respect to the camera coordinate system from the 2D image;

Step 657'~determining matrix $S_i$ corresponding to position $Q_i$;

Step 658'~repeating steps 654', 655', 656', 657' a number of times, changing the position each time between the optical device and the calibration object;

Step 661'~acquiring a 2D image of the targets on calibration object, and estimating the relative position of the targets with respect to the camera coordinate system from the 2D image Step 662'~determining transformation matrix A;

Step 659'~determining transformation matrix B.

In step (b) the camera arrangement provides at least one electronic 2D image of said markers with respect to a camera coordinate system. The relative locations of said markers with respect to one another as they appear from said viewpoint from said 2D image are obtained, and said transformation matrix $S_i$ is determined, correlated to at least one of a geometrical rotation and a geometrical translation that is/are required to be applied to said locations of said markers, referenced to said marker coordinate system, to provide relative locations between said markers that match the relative locations of corresponding said markers, as defined by said 2D image according to preset criteria. For example, such criteria may include a suitable matching procedure that best matches the pattern of the markers, as they appear in the 2D image, to the pattern obtained at one particular orientation of the markers coordinate system. Thus, step (b) is carried out in a manner not requiring, i.e., excluding, the 3D reconstruction of the markers, nor does it require such a 3D reconstruction to find the orientation of the marker coordinate system, which instead is found in a fast and economical manner. Thus, step (b) is carried out in the absence of, or requirement for, a 3D reconstruction of the markers. In other words, step (b) is carried out by effectively finding a transformation between the location of the markers in the 2D image, i.e., as formed by corresponding rays from the respective markers to the 2D image in the direction through the 2D image plane, and their 3D known locations in the marker coordinate system.

The method may further comprise step (d) of defining at least one new, known location for said camera viewpoint with respect to said global coordinate system. For example, the location of the camera arrangement may be moved, or the new camera viewpoint may be provided by a different camera arrangement. Steps (a) to (c) may be repeated at least one time at said new location to generate each time a respective modified digital model of a respective said part of said object corresponding to said new location of said viewpoint, and further comprising combining said modified digital models into a unified digital model referenced to the same coordinate system. Step (d) may be repeated for each of a plurality of different said new known camera viewpoint locations for each viewpoint with respect to said global coordinate system, and may further comprise combining said modified digital models into a unified digital model referenced to the same coordinate system.

A plurality of visually exposed optical targets may be provided, located in fixed spatial relationship with said object at known locations with reference to a target coordinate system. At least one group of said targets may be viewed by said camera arrangement at each said location of said viewpoint thereof, and the method may further comprise determining a spatial relationship between the target coordinate system and the external camera arrangement at each said location of said respective viewpoint, based on relating the relative locations of said group of targets with respect to one another, as they appear from the respective viewpoint of said external camera arrangement, with the relative locations of respective said targets with respect to one another as referenced to said target coordinate system. The modified digital models associated with respective different said viewpoints may be combined based on said determined spatial relationships between the target coordinate system and the respective external camera arrangement at the respective said respective viewpoint.

The optical device may further provide the location of at least one group of said targets at each said viewpoint thereof referenced to the respective said local coordinate system, and based thereon providing a spatial relationship between the target coordinate system and the local coordinate system at each said respective viewpoint. The modified digital models associated with respective different said viewpoints are combined based on said spatial relationships between the target coordinate system and the respective the local coordinate systems.

For example, an embodiment of the method using two camera locations or viewpoints may comprise the following steps:

Step 801~positioning camera so that markers on optical device and markers on object and/or pedestal, are within field of view of camera;

Step 805~providing a relative disposition between optical device and object~position $P_i$;

Step 810~creating a digital model $DM_i$ of part $O_i$ of the object referenced to the local coordinate system of the optical device at position $P_i$;

Step 820~acquiring a 2D image of the markers on optical device, and estimating the relative position of the markers with respect to the camera coordinate system from the 2D image;

Step 830~generating a digital model $M_i$ corresponding to digital model $DM_i$ of part $O_i$ of the object, referenced to the global coordinate system;

Step 840~repeating steps 810, 820, 830 a number of times, changing the position each time between the optical device and the object;

Step 850~combining digital model $M_i$;

Step 835~acquiring a 2D image of the markers on object and/or pedestal, and estimating the relative position of the markers with respect to the camera coordinate system from the 2D image;

Step 860~positioning camera at least at one different position, or providing a different camera at that position, with markers on optical device and markers on object and/or pedestal, are within field of view of camera, and repeating, at the or each different camera position, steps 810, 820, 830, 840, 850, 835;

Step 870~transforming digital models obtained at each camera position to a common coordinate system;

Step 880~combining digital models.

For example, another embodiment of the method using two camera locations or viewpoints may comprise the following steps:

Step 801'~positioning camera so that markers on optical device are within field of view of camera;

Step 805'~providing a relative disposition between optical device and object~position $P_i$;

Step 810'~creating a digital model $DM_i$ of part $O_i$ of the object referenced to the local coordinate system of the optical device at position $P_i$;

Step 820'~acquiring a 2D image of the markers on optical device, and estimating the relative position of the markers with respect to the camera coordinate system from the 2D image;

Step 830'~generating a digital model $M_i$ corresponding to digital model $DM_i$ of part $O_i$ of the object, referenced to the global coordinate system Step 840'~repeating steps 810', 820', 830' a number of times, changing the position each time between the optical device and the object;

Step 850'~combining digital models $M_i$;

Step 835'~transforming digital model to target coordinate system;

Step 860'~positioning camera at a different position or providing a different camera at that position, with markers on optical device are within field of view of camera, and repeat, at the or each different camera position, steps 810', 820', 830', 840', 850', 835';

Step 880'~combining digital models.

In at least some embodiments of the invention, the said camera arrangement comprises at least one first camera defining said viewpoint and at least one second camera rigidly coupled thereto, and the method further comprises providing a plurality of visually exposed optical targets located in fixed spatial relationship with said object at known locations with reference to a target coordinate system, wherein said targets are within a field of view of said second camera. The spatial relationship between the target coordinate system and said second camera may be determined, based on relating the relative locations of said targets with respect to one another, as they appear with respect to said second camera, with the relative locations of respective said targets with respect to one another as referenced to said target coordinate system. At least one said respective relative location of said optical device with respect to said object may be provided by independently moving said object and said optical device. Each one of said object and said optical device may be independently moved with respect to multiple degrees of freedom. Steps (a) to (c) may be repeated at least two times, wherein each said time at least one of said object and said optical device is moved so that said optical device is at a different said respective relative location with respect to said object and a respective modified digital model is generated of a respective said part of said object; the method further comprises the step of combining said modified digital models thus generated into a unified digital model. In step (c), a transformation matrix $T_{ij}$ may be applied to said digital model, wherein said transformation matrix $T_{ij}$ is configured for converting surface coordinates of said digital model from the local coordinate system to coordinates referenced to said global coordinate system, to provide said transformed digital model, wherein said transformation matrix $T_{ij}$ is obtained from transformation relationship:

$$T_{ij}=R_j*G*(S_i)^{-1}*(B)^{-1}$$

wherein:

G is a known transformation matrix between a first camera coordinate system associated with said first camera and a second camera coordinate system associated with said second camera;

B is a known transformation matrix between the markers coordinate system and the local coordinate system;

$R_j$ is a transformation matrix between the second camera coordinate system and the target coordinate system, determined in step (b), corresponding to the location of the object;

$S_i$ is a transformation matrix between the first camera coordinate system and the marker coordinate system, determined in step (b), corresponding to the location of the optical device.

For example, an embodiment of the method using two rigidly coupled cameras may comprise the following steps:

Step 901~positioning camera head so that markers on optical device are within field of view of first camera and targets on object and/or pedestal, are within field of view of second camera;

Step 905~providing a relative disposition of optical device in space S~position $P_i$; providing a relative disposition of object in space S~position $Q_j$;

Step 910~creating a digital model $DM_{ij}$ of part $O_{ij}$ of the object referenced to the local coordinate system of the optical device at position $P_i$;

Step 920~acquiring with first camera a 2D image of the markers on optical device, and estimating the relative position of the markers with respect to the first camera coordinate system $CCS_A$ from the 2D image;

Step 935~acquiring with second camera a 2D image of the targets on object and/or pedestal, and estimating the relative position of the targets with respect to the second camera coordinate system $CCS_B$ from the 2D image;

Step 930~generating a digital model $M_{i,j}$ corresponding to digital model $DM_{i,j}$ of part $O_{i,j}$ of the object, referenced to the global coordinate system;

Step 940~repeating steps 910, 920, 935, 930 a number of times, changing each time the position of the optical device (position $P_i$) and/or the position of the object (position $P_j$);

Step 950~combining digital models $M_{i,j}$ to generate model M.

According to a second aspect of the invention, there is provided a system for providing a digital model of at least a part of an object referenced to a global coordinate system, comprising:

(A) an optical device configured for providing a digital model representative of the respective part at a respective relative location with respect to said object, said first digital model being referenced to a local coordinate system associated with said optical device, and wherein said optical device comprises a plurality of visually exposed optical markers, said markers being located at known locations with respect to said optical device referenced to a marker coordinate system;

(B) an external camera arrangement configured for determining a location of the optical device with respect to said external camera arrangement, based on relating the relative locations of said markers with respect to one another, as they appear from a viewpoint of said external camera arrangement, with the relative locations of respective said markers with respect to one another as referenced to said marker coordinate system, and wherein said viewpoint is at a known location referenced to said global coordinate system; and (C) microprocessor device configured for generating a transformed digital model representative of the respective part and referenced to said global coordinate system, based on modifying said first digital model according to said determined location.

The camera arrangement may be movable to provide at least one new viewpoint therefor. At least one of said optical device and said object may be movable with respect to said camera arrangement. The camera arrangement may comprise at least one first camera defining said viewpoint and at least one second camera rigidly coupled thereto, and further comprising a plurality of visually exposed optical targets located in fixed spatial relationship with said object at known locations with reference to a target coordinate system, wherein said targets are within a field of view of said second camera.

The system may be operated in a manner corresponding to the method according to the first aspect of the invention.

According to a third aspect of the invention, there is provided a computer readable medium that embodies in a tangible manner a program executable for generating a digital model of at least a part of an object, the computer readable medium comprising:

a first set of data representative of a surface of said part, referenced to a local coordinate system;

a second set of data representative of a determined location of the local coordinate system with respect to a datum coordinate system, i.e. camera coordinate system;

a third set of data representative of a determined location of the global coordinate system with respect to said datum coordinate system;

means for applying said second and third sets of data to said first set of data to provide a fourth set of data representative of a surface of said part, referenced to said global coordinate system;

The medium may comprise, for example, any one of optical discs, magnetic discs, magnetic tapes, and the like.

The medium may incorporate the method according to the first aspect of the invention.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1:
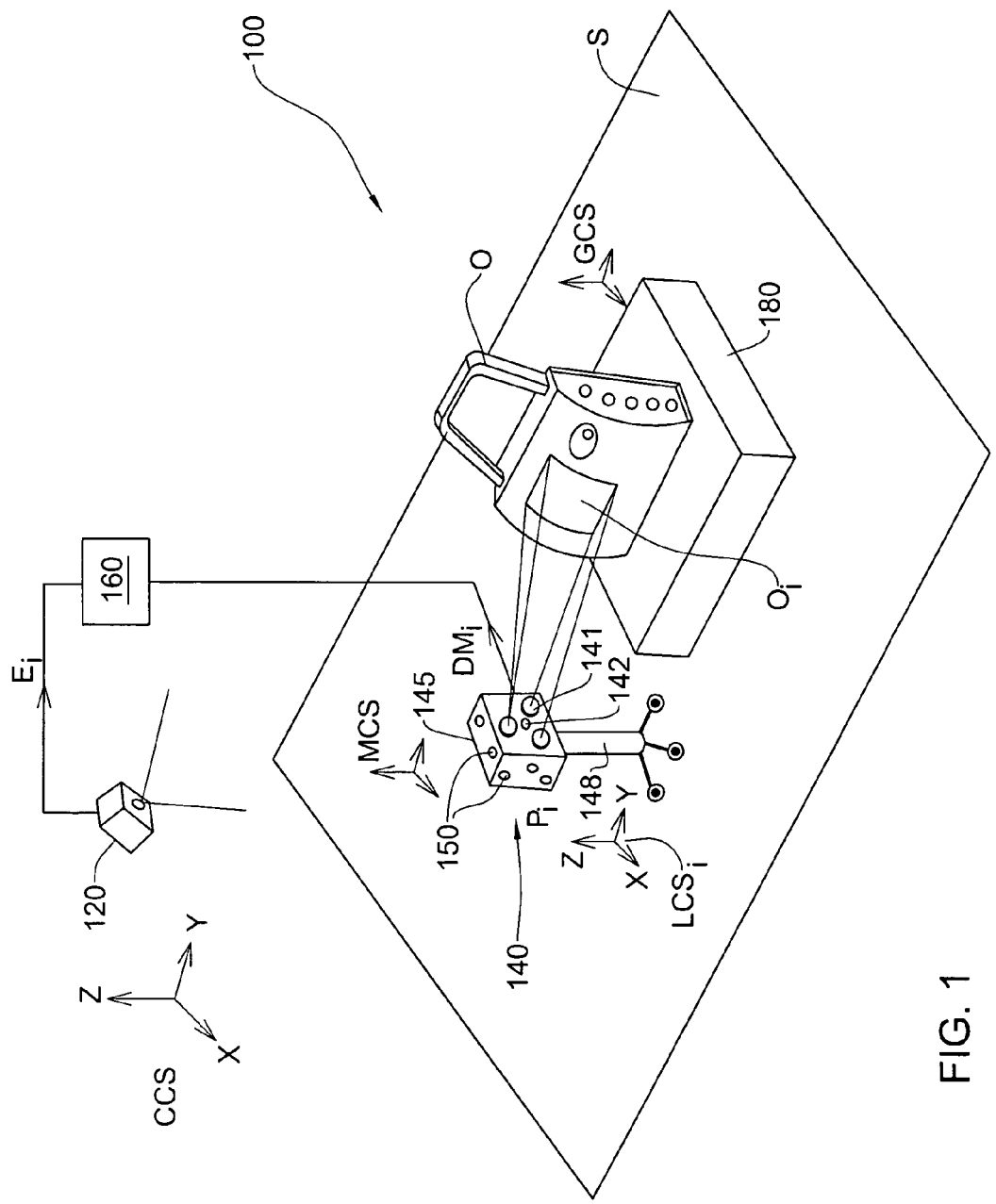
FIG. 1 is a schematic illustration of a system according to a first embodiment of the invention.

Referring to FIG. 1, a system according to a first embodiment of the invention, generally designated with reference numeral 100, comprises an image acquisition device comprising an external camera arrangement in the form of camera 120, an optical device 140 and a microprocessor device 160, for generating a digital model of an object O within an object space S.

The object O is shown, by way of non-limiting example, as a car door, whose surface is to be reconstructed as a digital model, and the skilled practitioner appreciates that object O may instead comprise, for example, any other type of object, part of an object, collection of objects, a scene, and so on.

Optical device 140 is a 3D image recording device capable of providing sufficient information for reconstructing 3D surfaces of an object, in this example, object O. In this embodiment, optical device 140 is in the form of an optical head, comprising two or three cameras 141 accommodated in a common housing 145 in stereoscopic relationship, such that the cameras optically record object O via 2D images from different but fixed relative perspectives. The optical device 140 further comprises projector 142 for projecting structured light, typically coherent (laser) light, to the object O, particularly when the object O does not have characteristic image features which facilitate electronic processing of the images, though in alternative variations of this embodiment other markings may be applied to the object O. The device 140 is further configured for enabling reconstructing such surfaces to generate a digital model (also referred to herein as a virtual model or a computer model) of the surfaces, and thus comprises a dedicated image processing device for deriving the 3D digital model from the plurality of images from different perspectives that are acquired, substantially simultaneously, by the various cameras 141 of the device 140. Such operation of optical device 140 is also referred to herein as "scanning". The optical device 140 is further configured for storing and/or outputting the digital model to the microprocessor device 160. Suitable examples of optical device 140 commercially available include image recording systems "Optigo" and "Opticell" from CogniTens Ltd., Israel, which includes three cameras in equilateral triangle arrangement, and system "Advent" from "ActiCM", which includes two CCD cameras in juxtaposed configuration and a structured light projector.

In alternative variations of this embodiment, the optical device 140 is configured for providing such information to microprocessor device 160, which is itself configured for processing the information to enable such 3D reconstruction, and for storing, manipulating and/or outputting the digital model.

In yet other variations of this embodiment, the optical device 140 may comprise any other suitable 3D image recording device capable of providing sufficient information for reconstructing 3D surfaces of an object and optionally also for carrying out such a reconstruction to provide a digital image of the object.

The optical device 140 is mounted on movable frame 148 that enables the optical device 140 to me translated and/or rotated so as to direct the field of view of the optical device 140 in any desired direction, and thus enable any part of the object O to be scanned thereby. In alternative variations of this embodiment, the optical device 140 may be mounted on a robotic arm, or a gantry, or may be hand-held, for example, enabling any desired relative position with respect to the object O to be attained.

The optical device 140 further comprises a plurality of markers 150 arranged on the housing 145, such that at least a minimum number of the markers 150 are optically visible within the object space S by camera 120. The markers 150 comprise, in this embodiment, light emitting diodes, each of a particular colour. In alternative variations of this embodiment, the markers may comprise retro-reflective markers, or patches or labels, coded with respect to shape and/or pattern and/or colour. In yet other alternative variations of this embodiment, the markers may comprise infra red emitters or ultraviolet emitters.

The markers 150 are arranged in a particular pattern on the housing 145 so that in general at least five markers 150 are always visible when the housing 145 is viewed from any direction within a desired range of directions in space S. Further, the relative spatial positions of the markers 150 with respect to one another is such that when the housing 145 is viewed from a plurality of different desired viewing directions with respect thereto, in each such viewing direction at least the aforesaid minimum number of markers 150 are visible (though not necessarily the same combination of markers every time), arranged in a unique relative disposition and/or with a unique spacing distribution between the visible markers. The relative spatial positions of the markers 150 with respect to one another, and thus with respect to the housing and optical device 140, according to a 3D local coordinate system MCS is known, or else is determined via a mapping procedure 600.

Referring to FIG. 2(a), the relative dispositions of the markers 150 may be calibrated via mapping procedure 600, which is essentially carried out by means of an external mapping system, which is independent of the local coordinate system LCS of optical device 140. Such an external mapping system, which may comprise, for example the V-STARS system manufactured by Geodetic Systems Inc, USA, may use photogrammetry or any other suitable technique for determining the 3D positions of the markers 150 with respect to an independent 3D coordinate system, MCS.

Camera 120 has a field of view FOV that includes at least a portion of space S including all desired positions of the optical device 140 therein, and is particularly configured for acquiring a 2D electronic image of the markers 150 in their relative dispositions within the object space S, as they appear from the location i.e. viewpoint of the camera 120. In this embodiment, camera 120 comprises a single camera, but in alternative variations of this embodiment, a group or cluster of cameras may be provided instead, in which case the 2D images provided by each camera in the group having a common image plane, or alternatively having different image planes in known spatial relationship one to another, so that the images obtained by each such camera may be transformed with respect to a particular reference image plane associated with the 3D camera coordinate system of the camera cluster.

In this embodiment the camera 120 is configured also for acquiring an electronic 2D image of the optical device 140. Referring also to FIG. 1b, the camera 120 is operatively connected to the microprocessor device 160, which is configured to detect and identify the markers 150 in such an electronic 2D image at an image plane 121 associated with the camera coordinate system CCS, and to thereby determine the position (i.e., spatial position and/or orientation) of the markers coordinate system, MCS with respect to the camera 120, and thus of optical device 140 within space S.

According to at least some embodiments of the invention, the determination of the position of the coordinate system MCS may be done in any suitable manner from a single said 2D image, or a plurality thereof for better accuracy, obtained by camera 120.

In at least one embodiment, microprocessor device 160 comprises a virtual 3D computer model of the markers 150 referenced to the marker coordinate system, MCS. The microprocessor device 160 determines the orientation and spatial position the markers in such a 3D model need to be such that the projection of the position of these markers along imaginary rays projected to the image plane of the 2D image from the respective markers 150 results in projected positions of the markers at the image plane that appear in the same pattern, distribution, spacing and so on, as the pattern, distribution, spacing and so on, respectively, of the image of the markers in the said 2D image 121, for example according to the best fit viz-a-viz the 2D image. Then, the transformation required for converting the coordinates of the targets 150 with respect to the MCS to their new orientation and position can be easily derived. Additionally or alternatively, other methods may be used determining this orientation and spatial position, for example using outlier removal techniques, weighted best match techniques, or as disclosed in U.S. Pat. No. 6,556,705, assigned to the present Assignee and the contents of which are incorporated herein in their entirety. Thus, the determination of the 3D positions of the markers 150 with reference to the camera coordinate system CCS, is carried out in a manner not actually requiring 3D reconstruction of the markers 150.

Figure 1A:
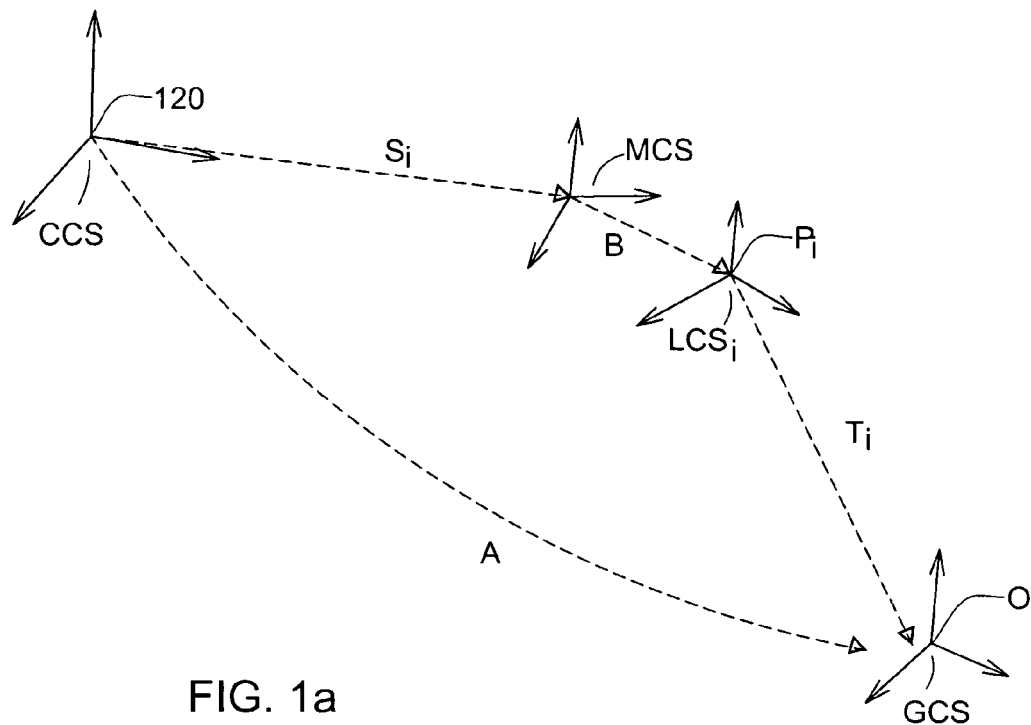
FIG. 1a schematically illustrates spatial relationships between various coordinate systems of the embodiment of FIG. 1.
Figure 1B:
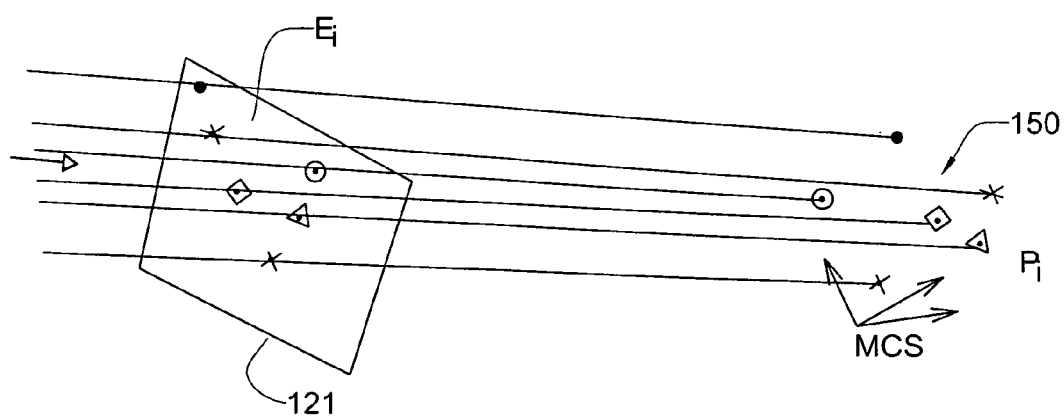
FIG. 1b schematically illustrates the relationship between the orientation of the coordinate system of the markers of the embodiment of FIG. 1 with respect to the viewpoint of the camera thereof, and the pattern of the markers in a 2D image at the camera.
Figure 2:
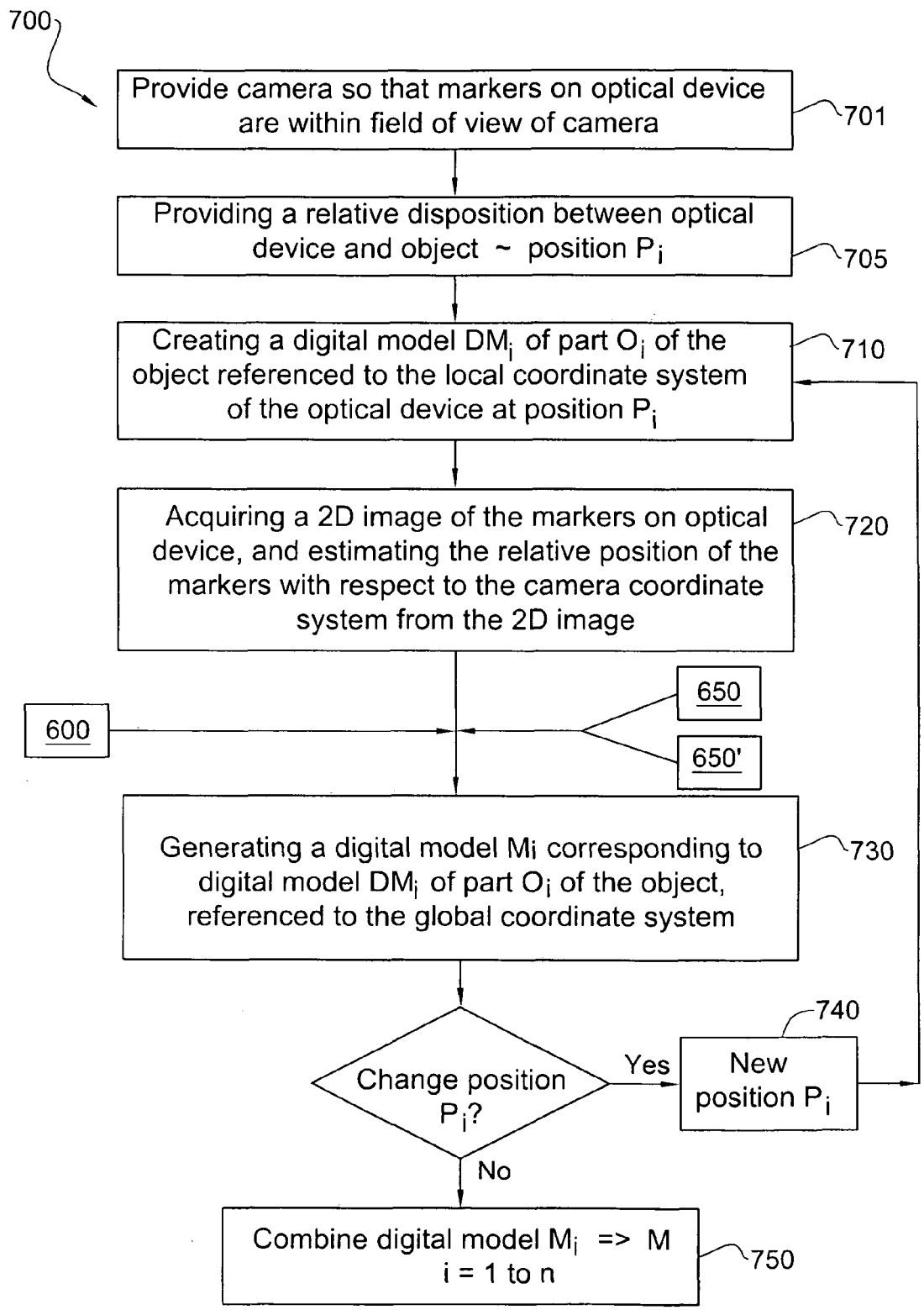
FIG. 2 illustrates a method for providing a digital model according to a first embodiment of the invention.

Referring also to FIG. 1*a* and FIG. 2, the system 100 operates according to method 700 for obtaining, i.e. reconstructing, the surface topology of the object O with respect to a 3D global coordinate system GCS, as follows. Having provided the camera 120 in step 701 so that the markers 150 on the optical device 140 are within the field of view of the camera 120, in step 705, optical device 140 is placed in a particular position $P_i$, i.e., having a particular spatial position and relative orientation with respect to object O, so that a portion $O_i$ of the surface of the object O is within the field of view of the optical device 140 and may be scanned by it. Then, in step 710, the topology of this portion $O_i$ is reconstructed by the optical device 140 in a manner known per se (for example, by applying any one of triangulation, epipolar or confocal techniques), thereby generating a digital model $DM_i$, which is referenced to a corresponding 3D local coordinate system $LCS_i$ with respect to the optical device 140.

Concurrently (though alternatively this may be done at any time prior to or after step 710, so long as the relative spatial disposition and orientation between the camera 120 and the optical device 140 remains unchanged), in step 720, the camera 120 acquires a 2D electronic image $E_i$ of the optical device 140 at image plane 121, in particular the markers 150 thereon, in its position $P_i$ in which digital model $DM_i$ was generated (FIG. 1*b*), i.e., from the viewpoint of the camera 120. The microprocessor device 160 determines, from the relative dispositions of the markers 150 as they appear in this 2D image $E_i$, the position of the markers 150, and thus of optical device 140, with respect to the 3D camera coordinate system CCS, and a transformation matrix $S_i$ is then generated, defining the relationship between the 3D coordinate system CCS of camera 120 and the coordinate system MCS of the markers 150.

In step 730, the digital model $DM_1$ is converted to transformed digital model $M_i$, which is referenced to the global coordinate system GCS, by means of the following transformation relationship:

$$A = T_i * B * S_i \qquad (1)$$

wherein:

A is the transformation matrix between the 3D coordinate system of camera 120 and the 3D global coordinate system GCS;

B is the transformation matrix between the 3D coordinate system MCS of markers 150 and the 3D local coordinate system $LCS_i$;

Ti is the transformation matrix for converting the coordinates of the digital model $DM_i$ from the 3D local coordinate system $LCS_i$ to the 3D global coordinate system GCS, to provide transformed digital model $M_i$;

$S_i$ is the aforesaid transformation matrix between the 3D coordinate system CCS of camera 120 and the coordinate system MCS of the markers 150.

Thus, transformation matrix $T_i$ may be applied to the digital model $DM_i$ to convert it to provide digital model $M_i$ of portion $O_i$ of the object O, referenced to the global coordinate system GCS.

The transformation matrix $T_i$ is thus provided by the relationship:

$$T_i = A * (S_i)^{-1} * (B)^{-1} \qquad (2)$$

wherein $(S_i)^{-1}$ and $(B)^{-1}$ are the inverse matrices corresponding to matrices $S_i$ and B, respectively.

For this purpose, since matrices A and B, are constants, i.e. fixed, known matrices, for the set up in FIG. 1 (i.e., where the relative positions of the markers 150 with respect to the optical device 140 is unchanged, and the location of the camera 120 with respect to the object O is also unchanged, at least while the object O is being scanned), and are known, or first determined via calibration procedure 650, for example, as described below. Further, $S_i$ is determined in step 720 for the particular position $P_i$. Thus, the transformation $T_i$ may be determined and subsequently applied to digital model $DM_i$ to generate the corresponding digital model $M_i$ referenced to the global coordinate system GCS.

In step 740, the optical device 140 is moved to a different position $P_j$ with respect to the object O, so that a different portion $O_j$ thereof is within the field of view of the optical device 140, and steps 720 and 730 are repeated at this new position so that a digital model of this portion is generated, referenced to the global coordinate system GCS.

Step 740 can be repeated as many times as desired, each time choosing a different portion of the object O, whether or not it overlaps with other such portions of the object O, and generating each time a respective digital model thereof referenced to the global coordinate system GCS, until the entire object O is scanned, or a desired part thereof.

In step 750, the various digital models $M_i$ that were generated corresponding to respective portions $O_i$ of the object O, can be combined in a straightforward manner without the need for further transformation to be applied to the digital models $M_i$, to provide digital model M of the entire object O, or the aforesaid desired part thereof, since the digital models $M_i$ are all referenced to the same, global coordinate system GCS.

Figure 3A:
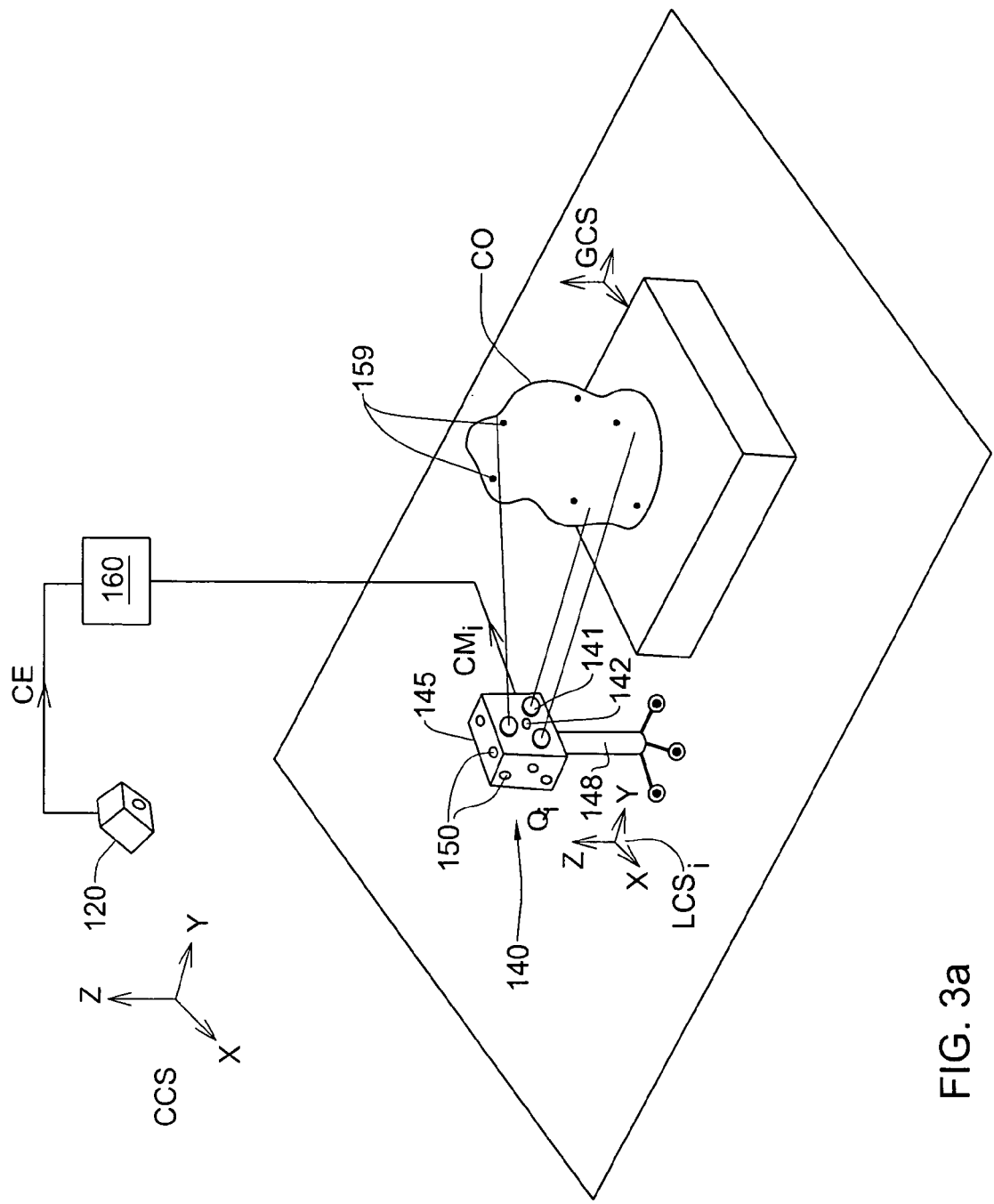
FIG. 3(a) illustrates a set up used for calibrating the embodiment of FIG. 1.
Figure 3B:
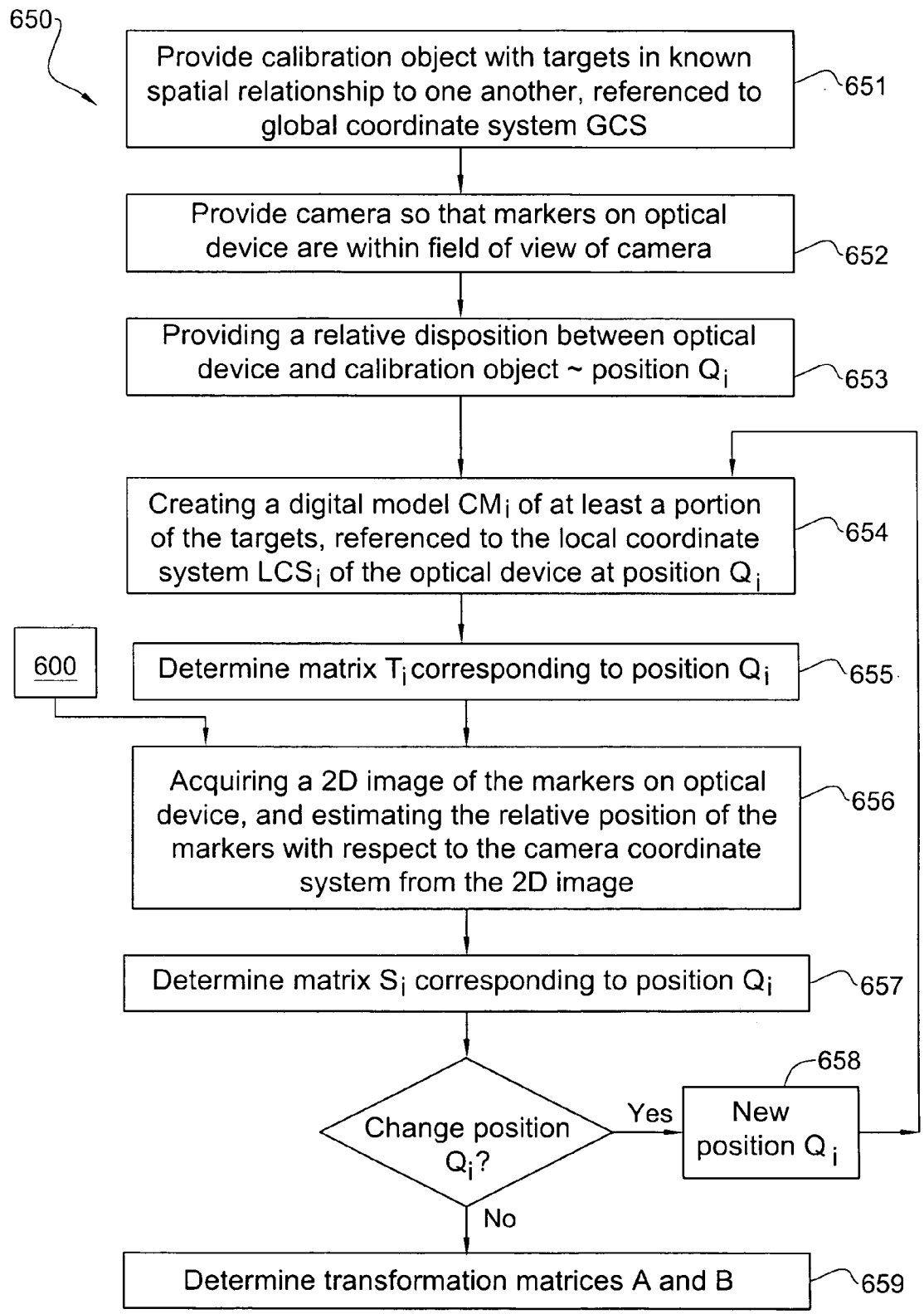
FIG. 3(b) and FIG. 3(c) illustrate calibration methods used with the embodiment of FIG. 3(a).

Referring to FIGS. 3*a* and 3*b*, calibration procedure 650 for determining matrix A and matrix B is provided, which procedure is essentially based on carrying out method 700 with respect to a calibration object CO rather than object O. Calibration object CO is characterized in that the 3D coordinates of at least a minimum number of points thereon (in the disclosed example, targets 159) are known with respect to one another, i.e. with respect to a common coordinate system (which defines the global coordinate system GCS), and which can also be determined also with respect to the coordinate system LCS of optical device 140, and wherein concurrently the position of the optical device 140 is also determined with respect to the coordinate system CCS of camera 120. In other words, in such a situation, the matrices $S_i$ and $T_i$ can be found for at least a number of positions of the optical device 140 with respect to the calibration object CO, which in turn enables matrices A and B to be found.

Calibration procedure 650 comprises step 651, in which a calibration object CO is placed in object space S, instead of object O. Calibration object CO comprises a plurality of targets 159, which are optically visible from an outside of the calibration object CO, in particular by camera 120, and may be similar to markers 150, mutatis mutandis. The targets 159 are arranged in fixed spatial relationship to one another on the calibration object CO, and either their relative positions with respect to the coordinate system of the calibration object CO, which defines the global coordinate system GCS, are known, or their relative positions with respect to the global coordinate system GCS may be determined in a mapping procedure applied to the calibration object CO, for example similar to mapping procedure 600 as described above for the position of markers 150 on object O, mutatis mutandis. Calibration object CO may comprise any suitable object, for example a standard geometric shape such as for example a sphere, cube and so on, or any other object, or indeed a frame that is configured simply for enabling the targets 159 to be placed thereon at fixed positions with respect to one another.

In step 652 it is ensured that the markers 150 of optical device 140 are in the field of view of camera 120.

In step 653, optical device 140 is placed in a particular position $Q_i$, i.e., having a particular spatial position and relative orientation with respect to calibration object CO, so that at least a minimum number of the targets 159 (typically three or more targets 159) is within the field of view of the optical device 140. In step 654 the targets 159 are scanned by optical device 140, and the coordinates of these viewed targets 159 are reconstructed by the optical device 140 in a manner known per se, for example as in step 710, mutatis mutandis, thereby generating a digital model $CM_i$ of the targets, which is referenced to a corresponding local coordinate system $LCS_i$ with respect to the optical device 140.

In step 655 matrix $T_i$ is determined, corresponding to position $Q_i$. Since the coordinates of the targets 159 with respect to the global coordinate system GCS are known, then the relationship between the global coordinate system GCS and the local coordinate system $LCS_i$ at position $Q_i$ may be determined, thereby providing transformation matrix $T_i$ for position $Q_i$.

Concurrently (though alternatively this may be done at any time prior to or after step 654, so long as the relative spatial disposition and orientation between the camera 120 and the optical device 140 remains unchanged), in step 656, the camera 120 acquires a 2D electronic image CE of the optical device 140, in particular the markers 150 thereon, in its position $Q_i$ in which digital model CM was generated. The microprocessor device 160 determines from the relative dispositions of the markers 150 in this 2D image CE, and the position of the optical device 140 with respect to the camera coordinate system CCS is then determined, in a similar manner to that described above with respect to FIG. 1b, mutatis mutandis. Thus, in step 657, transformation matrix $S_i$ is then generated corresponding to this position $Q_i$, defining the relationship between the 3D coordinate system CCS of camera 120 and the coordinate system MCS of the markers 150.

In step 658, the position $Q_i$ is changed, and thus steps 654 to 657 may be repeated for a number of different positions $Q_i$ between the optical device 140 and the calibration object CO, yielding respective matrices $T_i$ and $S_i$ at each respective position $Q_i$, and this enables relationship (1) above to be solved for matrices A and B in step 659, for example as follows.

In general, a transformation between a first coordinate system and a second coordinate system includes a rotation r and translation t, so that a 3D point p in the first coordinate system is transformed to a point p' in the second coordinate system according to the relationship:

$$p'=r*p+t \quad (3)$$

The rotation r may be represented by a 3-by-3 matrix, being a trigonometric function of rotation about each one of three orthogonal axes, and thus this relationship (3) can be represented as a 4-by-4 matrix having [r t] as its 3-by-4 upper portion and including [0001] as the last row of the 4-by-4 matrix, i.e., by applying a four-dimensional representation of the point having p as the first three elements and 1 as the last entry.

This enables the rigid transformations A, B to be represented as products of 4-by-4 matrices, in each of which there are 12 unknown entries: A and B can be considered as general matrices, each of which has an upper portion 3-by-4 of unknown values, followed by the last row having values [0001], and it is possible to obtain therefrom linear equations in 24 unknown elements. Each of the Ti*B*Si=A relationships provides 12 equations so in fact there is need for two relative positions between the calibration object CO and the optical device 140 to obtain 24 equations which can then be solved simultaneously to solve for the 24 unknown elements. Nevertheless, in practice more than two different such relative positions may be used for better accuracy.

In this manner, for example, the matrices A and B may be determined in step 659, and by further deriving the inverse matrix of B, i.e., $(B)^{-1}$, this enables the relationship (2) to be applied in step 730 to convert digital model $DM_i$ to digital model $M_i$ of portion $O_i$ of the object O, referenced to the global coordinate system GCS, where the object O has no marked points, and using a single camera.

It is to be noted that in this embodiment, while camera 120 and the object O remain in fixed positions during process 700, the camera 120, and/or indeed the object O, may nevertheless be moved after the calibration procedure 650. In other words, the relative position between the object O and the camera 120 must be fixed during measurement of the object, though this relative position may be different from that used during calibration, and thus the camera and/or object may not move during the measurement in this embodiment. When using different relative positions between the camera and object, effectively a different matrix A may apply at each relative position. Thus, in this embodiment object O is held in a fixture or pedestal 180, such that its position remains nominally unchanged at least while camera 120 and optical device 140 are operating.

Figure 3C:
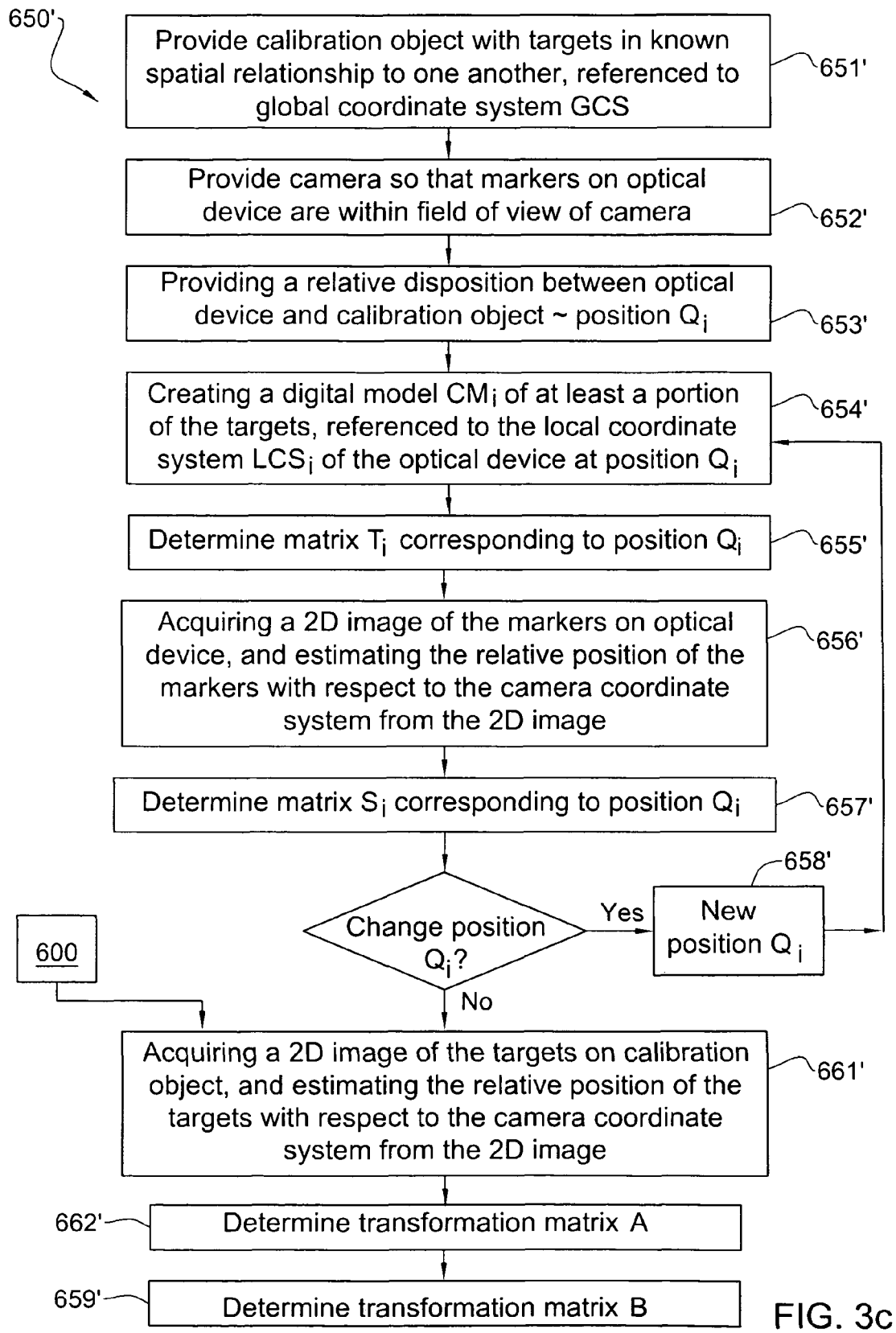

An alternative variation of the calibration procedure of FIG. 3(b) is shown in FIG. 3(c), in which the calibration method, designated 650', comprises steps 651', 652', 653', 654', 655', 656', 657', 658', respectively similar to steps 651, 652, 653, 654, 655, 656, 657, 658, of method 650, mutatis mutandis. However, in calibration procedure 650', in step 652', additionally the targets 159 are also within the field of view of camera 120. Furthermore, method 650' comprises steps 661', 662', in which matrix A is determined directly as follows. In step 661' the camera 120 acquires a 2D electronic image $CE_o$ of the targets 159. The microprocessor device 160 determines, from the relative dispositions of the targets 159 in this 2D image $CE_o$, the 3D positions of the targets 159 with reference to the camera coordinate system CCS, but in a manner not actually requiring 3D reconstruction of the targets 159, for example in a similar manner to step 656, mutatis mutandis. Then, in step 662', since the position of the targets 159 is known referenced to the global coordinate system GCS, transformation matrix A is generated.

In step 659', matrix B is found by applying relationship (1) to one or more sets of matrices $S_i$, $T_i$ obtained at respective positions $Q_i$, together with the matrix A obtained in step 662'.

Figure 4:
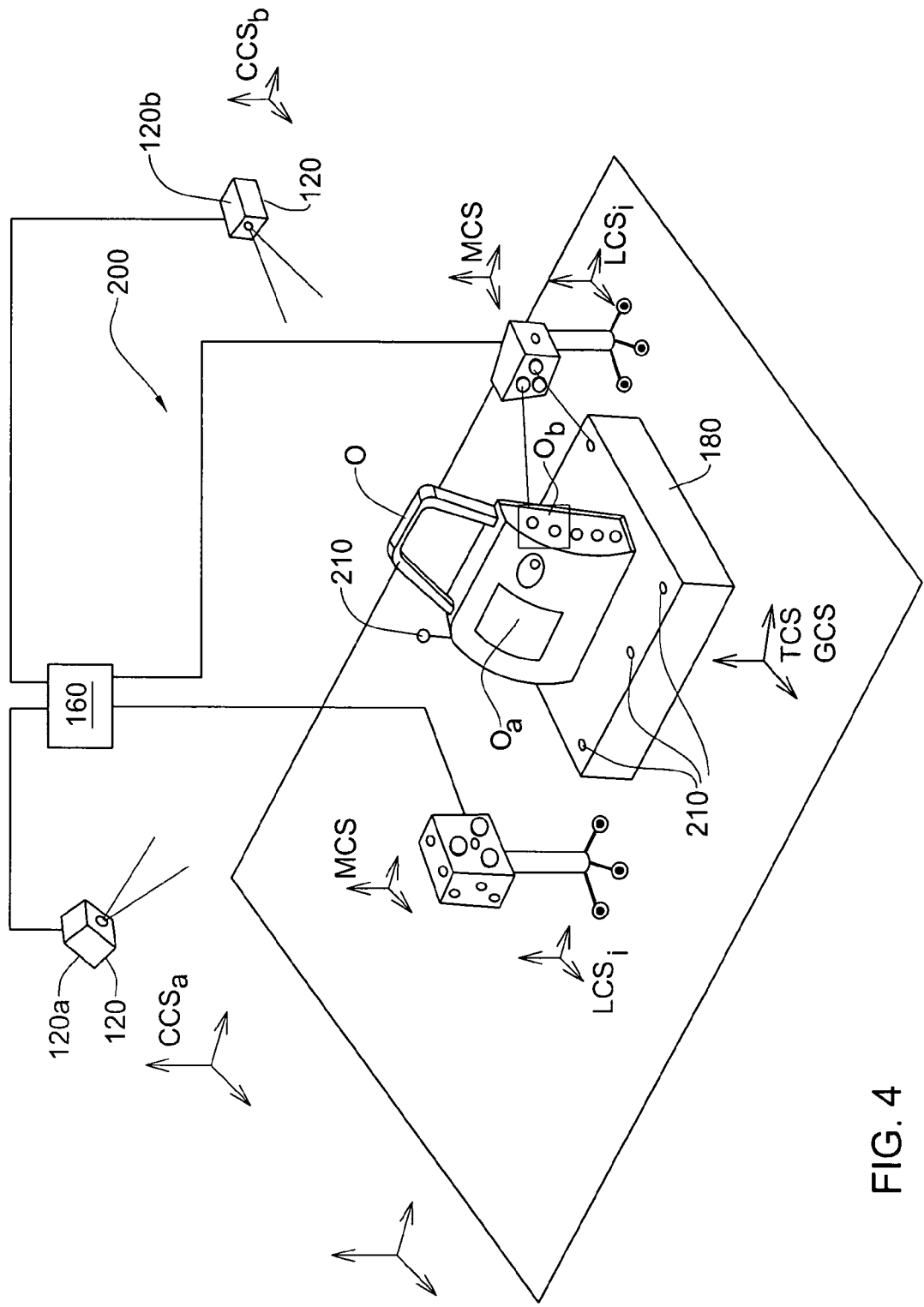
FIG. 4 is a schematic illustration of a system according to a second embodiment of the invention.

A second embodiment of the system of the invention, designated 200 and illustrated in FIG. 4, comprises the elements and features of the system 100 according to the first embodiment, mutatis mutandis. Thus, system 200 comprises an image acquisition device in the form of camera 120, an optical device 140 and a microprocessor device 160, for generating a digital model of an object O within an object space S, as disclosed for the first embodiment, mutatis mutandis. However, there are at least two additional features in the system 200 with respect to system 100. First, camera 120 is configured for being stationed, and thus moved between, at least two positions 120a, 120b while maintaining the object O in its field of view (though in alternative variations of this embodiments, a plurality of cameras 120 may be provided, at least one such camera in each respective position of the at least two position 120a, 120b, mutatis mutandis. In addition, a plurality of targets 210 is provided on the object O and/or on the pedestal 180 on which the object O is held such that object O is in a fixed position in space S. Thus, there are at least two viewpoints with respect to the object O during the measurements thereof.

System 200 may be operated according to each one of at least two methods for obtaining a digital model M of the object O, derived from having the aforesaid camera 120 in at least two positions 120a, 120b.

Figure 5:
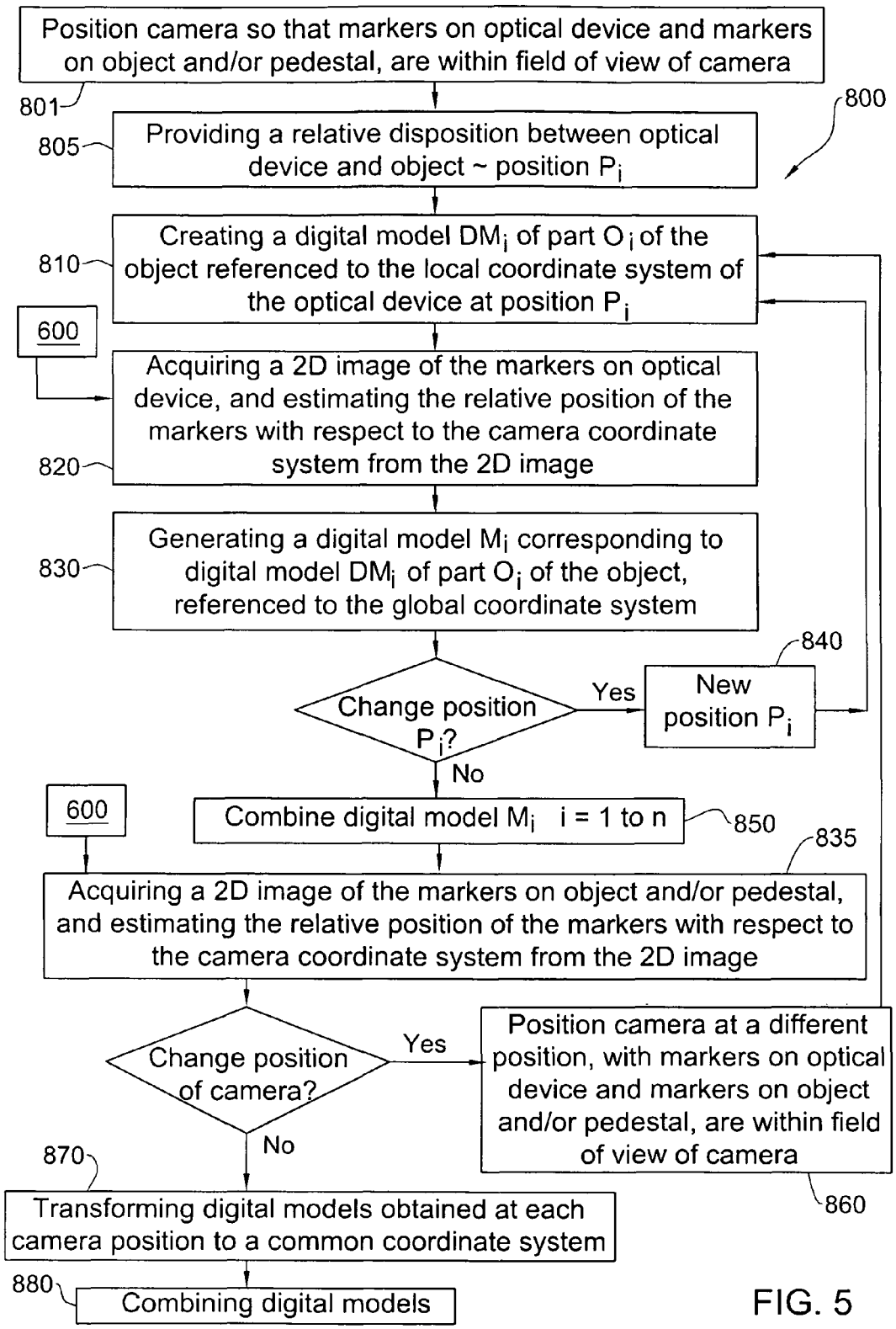
FIG. 5 illustrates a method for providing a digital model according to a second embodiment of the invention.

Referring also to FIG. 5, in one such method, designated with the reference numeral 800, digital models $M_a$ and $M_b$ generated with camera 120 at position 120a, and at position 120b, respectively, corresponding to parts $O_a$ and $O_b$ of object O, respectively, are spatially related to one another by means of further information provided by the camera 120 at these positions, to generate a combined digital model M referenced to the same global coordinate system. Thus, camera 120, at each said position 120a, 120b, is also configured to capture within its field of view at least a minimum number of said targets 210, typically five targets 210, while concurrently having the markers 150 in its field of view.

In step 801 of method 800, the camera 120 is placed in position 120a such that optical device 140 (and in particular the markers 150 thereof) and such that said minimum number of targets 210 are within the field of view of the camera 120, for the range of positions $P_i$ that it is wished to set between the object O and the optical device 140 for scanning part $O_a$ of the object. In step 805, the optical device 140 is placed in a particular position $P_i$ with respect to the object O, similar to step 705 of method 700, mutatis mutandis. Then, steps 810, 820, 830 are carried out, substantially as disclosed regarding steps 710, 720 and 730, respectively, of method 700, mutatis mutandis.

In step 840, the optical device 140 is moved to a different position $P_j$ with respect to the object O, so that a different portion $O_j$ thereof is within the field of view of the optical device 140, and steps 820, 830 are repeated at this new position so that a digital model of this portion is generated, referenced to the global coordinate system $GCS_a$. Step 840 can be repeated as many times as desired, each time choosing a different portion of the object O, whether or not it overlaps with other such portions of the object O, and generating each time a respective digital model thereof referenced to the global coordinate system $GCS_a$, until a desired part $O_a$ of the object O is scanned.

In step 850, the various digital models $M_i$ that were generated corresponding to respective portions $O_i$ of the object O obtained while camera 120 is at position 120a, can be combined to provide digital model $M_a$ of the part $O_a$ of object O is scanned, wherein the digital models $M_i$ are all referenced to the same, global coordinate system $GCS_a$, for camera position 120a.

In method 800, and in contrast to method 700, an additional step 835 is carried out with the camera 120 still in position 120a, that of acquiring a 2D image $CE_i$ of the targets 210 on object O and/or pedestal 180, and determining the relative position of the targets 210, i.e., the position of the target coordinate system TCS with respect to the camera coordinate system $CCS_a$ from the 2D image, as described above for other embodiments, mutatis mutandis. Step 835 can be carried out at any time prior to moving the camera 120 to a different position, and may be accomplished even if optical device 140 is removed from space S.

Step 835 is similar to step 720 or step 820, mutatis mutandis, and is based on determining the position of the targets 210 with respect to the camera's coordinate system $CCS_a$ at position 120a, from the relative dispositions of the targets 210 as they appear in this 2D image $CE_i$, i.e., from the camera's viewpoint at 120a, and the position of object O with respect to the camera coordinate system $CCS_a$ at position 120a is generated.

In step 860, the camera 120 is moved to another position, position 120b, such that optical device 140 (and in particular the markers 150 thereof) and such that said minimum number of targets 210 are within the field of view of the camera 120, for another range of positions $P_i$ that it is wished to set between the object O and the optical device 140 for scanning part of the object. Steps 805, 810, 820, 830, 835, 840 are then carried out for each desired new position $P_i$, followed by step 850 in which the various digital models $M_i$ that were generated corresponding to respective portions $O_i$ of the object O obtained while camera 120 is at position 120b, can be combined to provide digital model $M_b$ of the part $O_b$ of object O is scanned, wherein the digital models $M_i$ are all referenced to the same, global coordinate system $GCS_b$, for camera position 120b. Alternatively, a different camera 120 is used at position 120b.

Since the relative position of the camera 120 with respect to the object O has effectively or actually changed from position 120a to position 120b, the global coordinate system $GCS_a$ to which digital model $M_a$ is referenced will be different to global coordinate system $GCS_b$, to which digital model $M_a$ is referenced. In step 870, a transformation matrix is generated relating global coordinate system $GCS_b$ to global coordinate system $GCS_a$, based on determining the transformation required for changing the relative disposition between the target coordinate system TCS and the camera coordinate system $CCS_a$, as obtained in step 835 with camera 120 in position 120a, with the corresponding relative disposition between the target coordinate system TCS and the camera coordinate system $CCS_b$, as obtained in step 835 with camera 120 in position 120b. This is a straightforward operation, as the relative positions of targets 210 is unchanged, and known, with respect to $CCS_a$ and $CCS_b$, as already disclosed.

In step 880, a unified digital model M' comprising digital models $M_a$ and $M_b$, wherein one or the other of digital models $M_a$ and $M_b$ is transformed using a suitable transformation matrix so as to be referenced to the same global coordinate system of the other digital model, $M_b$ or $M_a$, respectively.

In the second embodiment, since it is intended for the camera 120 to move position, a new matrix A needs to be determined for each position of camera 120. Thus calibration procedure 650 may be applied to each camera position 120A, 120B, to generate the corresponding matrix A in each position, together with matrix B (which is constant). Alternatively, calibration procedure 650' may be provided at any desired position of the camera 120 to generate matrix B, and matrix A is generated in situ for each position of the camera 120 in step 835, in a similar manner to that of steps 661' and 662' of calibration method 650', but directed to targets 210 rather than the targets 159 of the calibration object.

If desired, the method 800 may be extended further for an additional position or for a plurality of positions of camera 120 in a similar manner as disclosed above, mutatis mutandis.

Alternatively, for each relative position between the optical device 140 and object O, for a given fixed position of the camera 120, in step 835 a transformation matrix is generated between the 3D coordinate system CCS of camera 120 at the respective position of the camera 120, and the 3D coordinate system MCS of targets 210. Then, the digital model $DM_i$, obtained in step 830 for the particular portion $O_i$ of the object being scanned at position $P_i$, is further transformed to generate a corresponding digital model referenced to the 3D coordinate system MCS of targets 210, which is taken as the global coordinate system. In this manner, each digital model that is obtained for a respective position of the camera 120 is referenced to the same coordinate system, and these digital models may be combined to generate a digital model of all the parts of object O that were scanned.

A feature of method 800 is that it can be used for effectively correcting for relative movement between the camera 120 and object O, even when the camera is not deliberately moved between desired discrete positions, since it provides an alignment between the camera and the object via the targets 210. Thus, steps 801 to 835 may be executed for one nominal position of the camera 120, followed by steps 870 at that nominal camera position, and step 880. In such a case, if there is an issue, or suspicion, of undesired camera vibration or movement, matrix A can be determined concurrently with each time the optical device 140 scans a part $O_i$ of the object O, for example as per steps 661', 662' as applied to targets 210 (rather than targets 159 of the calibration object), mutatis mutandis.

In another method for operating system 200 according to the second embodiment, designated herein with the reference numeral 800', digital models $M_a$ and $M_b$ generated with camera 120 at a respective one of position 120a and position 120b, corresponding to parts $O_a$ and $O_b$ of object O, are spatially related to one another by means of further information provided by the optical device 140 with camera 120 at these positions, to generate a combined digital model M referenced to the same global coordinate system. Thus, optical device 140, at each position $P_i$ thereof with respect to the object, is also configured to capture within its field of view at least a minimum number (typically five) of said targets 210, while concurrently scanning a portion of the object within its field of view.

Figure 6:
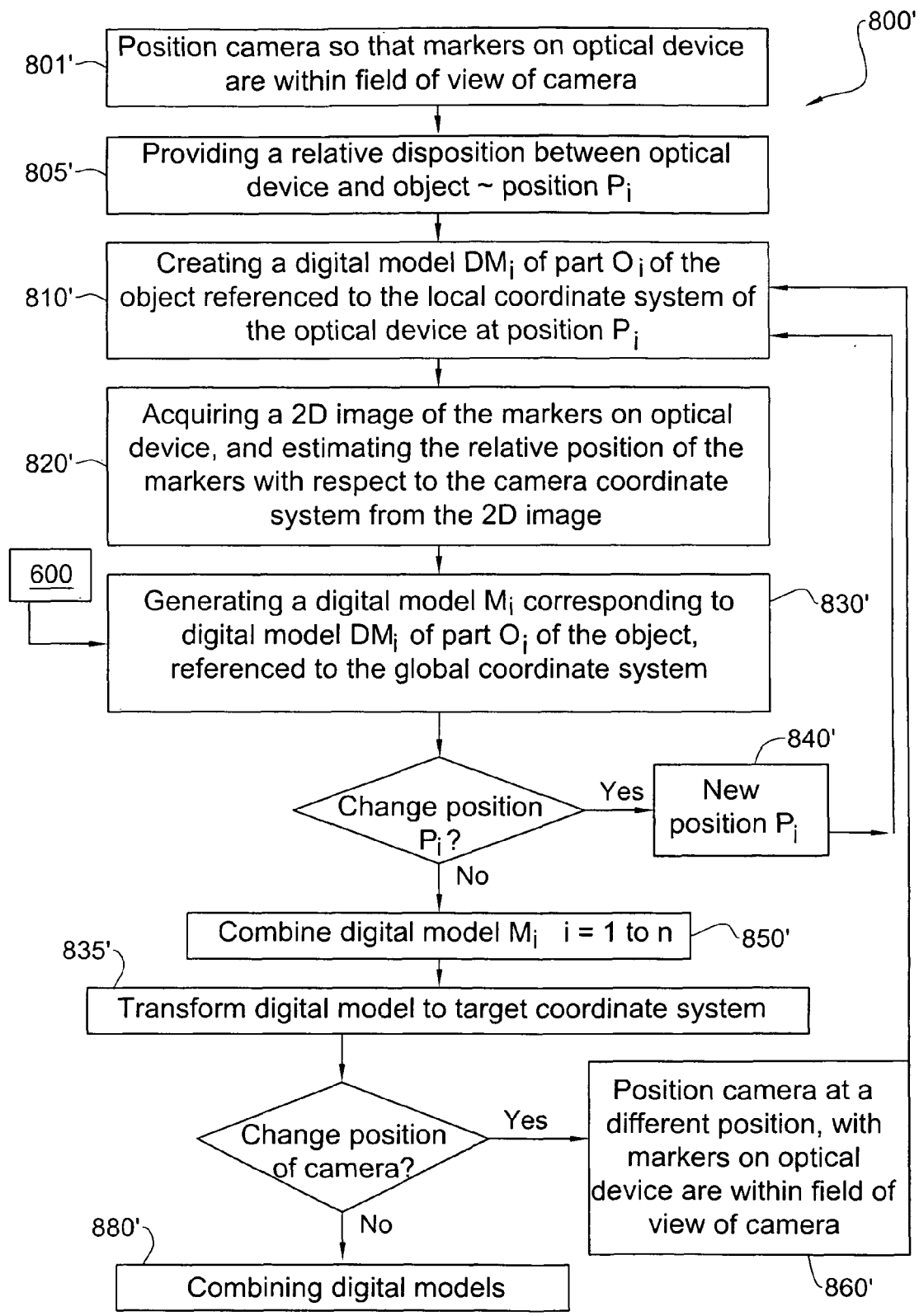
FIG. 6 illustrates an alternative method for providing a digital model according to a second embodiment of the invention.

Referring to FIG. 6, method 800' comprises step 801', which is similar to step 801 of method 800, mutatis mutandis, and in which the camera 120 is placed in position 120a such that optical device 140 (and in particular the markers 150 thereof) is within the field of view of the camera 120, for the range of positions $P_i$ that it is wished to set between the object O and the optical device 140 for scanning part $O_a$ of the object. Thus, step 801' does not require the targets 210 on the object O and/or pedestal 180 to be within the field of view of the camera 120. In step 805', the optical device 140 is placed in a particular position $P_i$ with respect to the object O, similar to step 805 of method 800, mutatis mutandis, and then, steps 810', 820', 830' are carried out, substantially as disclosed regarding steps 810, 820, 830, respectively, of method 800, mutatis mutandis.

Step 840' is similar to step 840 of method 800, mutatis mutandis, and the optical device 140 is moved to a different position $P_i$ with respect to the object O, so that a different portion $O_i$ thereof is within the field of view of the optical device 140, and steps 820', 830' are repeated at this new position so that a digital model of this portion is generated, referenced to the global coordinate system $GCS_a$ with respect to position 120a of the camera. Step 840' can be repeated as many times as desired, each time choosing a different portion of the object O, whether or not it overlaps with other such portions of the object O, and generating each time a respective digital model thereof referenced to the global coordinate system GCS, until a desired part $O_a$ of the object O is scanned. Then, in step 850', the various digital models $M_i$ that were generated corresponding to respective portions $O_i$ of the object O obtained while camera 120 is at position 120a, can be combined to provide digital model $M_a$ of the part $O_a$ of object O is scanned, wherein the digital models $M_i$ are all referenced to the same, global coordinate system $GCS_a$, for camera position 120a.

In method 800', an additional step 835' is carried out, comprising identifying at least three targets 210 in the digital model $M_a$. A transformation matrix is then generated between the 3D global coordinate system $GCS_a$ at the respective position of the camera 120, i.e., position 120a, and the 3D coordinate system MCS of targets 210. Then, the digital model $M_a$, obtained in step 850' for this position of the camera 120 for a range of positions $P_i$, is further transformed to generate a corresponding digital model $M_a'$ referenced to the 3D coordinate system MCS of targets 210, which is taken as the global coordinate system GCS.

In step 860', the camera 120 is moved to another position, position 120b, such that optical device 140 (and in particular the markers 150 thereof) are within the field of view of the camera 120, for another range of positions $P_i$ that it is wished to set between the object O and the optical device 140 for scanning part of the object. Steps 805', 810', 820', 830', 840' are then carried out for each desired new position $P_i$, followed by step 850 in which the various digital models $M_i$ that were generated corresponding to respective portions $O_i$ of the object O obtained while camera 120 is at position 120b, can be combined to provide digital model $M_b$ of the part $O_b$ of object O is scanned, wherein the digital models $M_i$ are all referenced to the same, global coordinate system $GCS_b$, for camera position 120b. Then, step 835' is repeated, this time identifying at least three targets 210 in the digital model $M_b$, and a transformation matrix is then generated between the 3D global coordinate system $GCS_b$ at the respective position of the camera 120, i.e., position 120b, and the 3D coordinate system MCS of targets 210. Then, the digital model $M_b$, obtained in step 850' for this position of the camera 120 for a range of positions Pi, is further transformed to generate a corresponding digital model $M_b'$ referenced to the 3D coordinate system MCS of targets 210, i.e., the global coordinate system GCS.

In step 880', a unified digital model M' comprising digital models $M_a'$ and $M_b'$, same global coordinate system GCS.

It is to be noted that targets 210 identified at position 120B of the camera can be different from the targets identified at position 120A of the camera, so long as the relative positions between all the targets 210 referenced to the same coordinate system GCS are known (typically beforehand, via a mapping procedure such as 600, mutatis mutandis). An advantage of such a feature is that, for example, when carrying out method 800' on a relatively large object O, the targets 210 may be provided in discrete groups or blocks, each block being mounted in fixed geometric relationship to the object O. Then, the spatial positions of the targets in each block may be determined by a mapping procedure 600, mutatis mutandis, and the blocks may be integrated into a single global coordinate system by applying another mapping procedure to link the blocks.

If desired, the method 800' may be extended further for an additional position or for a plurality of positions of camera 120 in a similar manner as disclosed above for positions 120a, 120b, mutatis mutandis.

Figure 7:
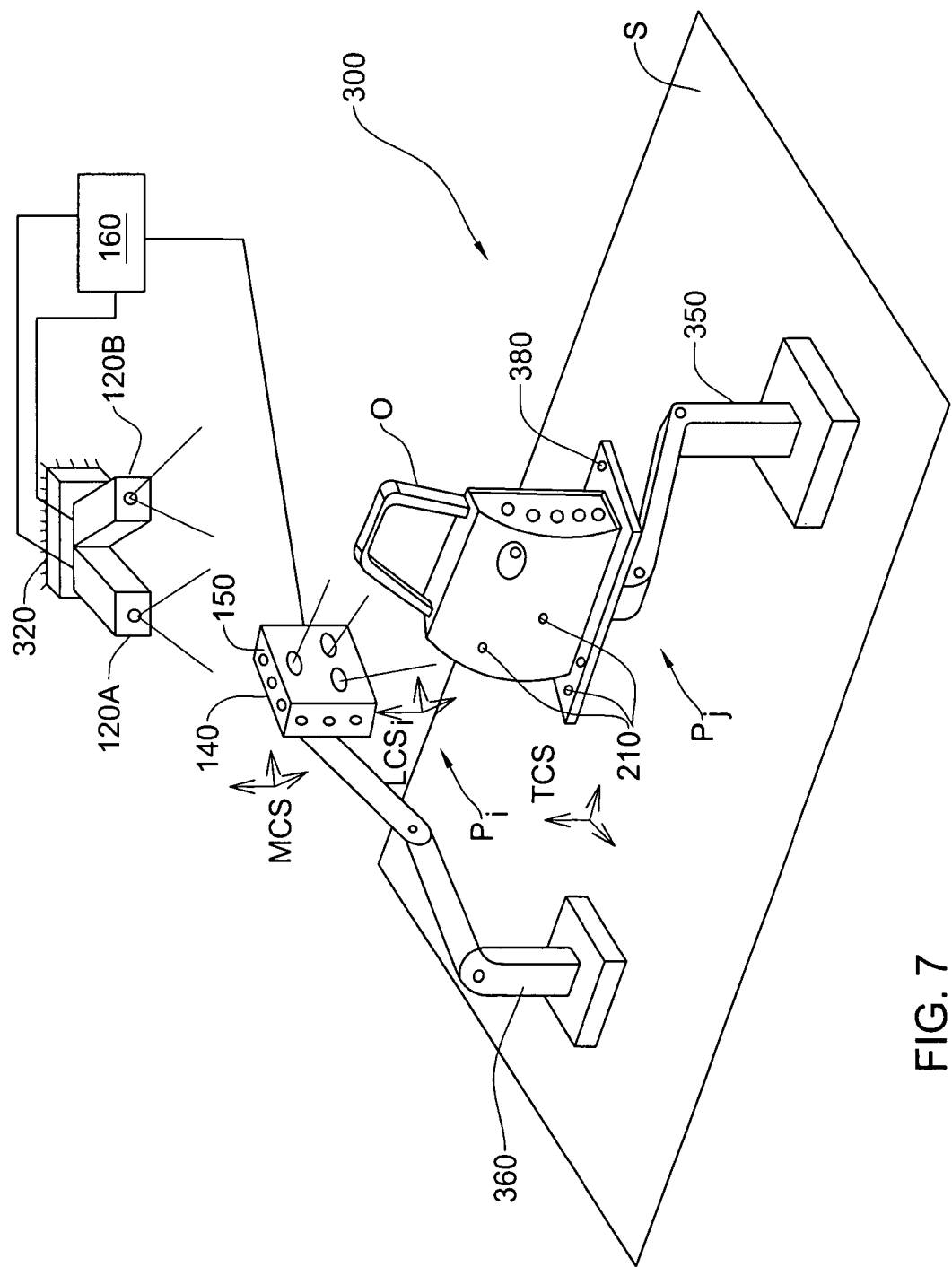
FIG. 7 is a schematic illustration of a system according to a third embodiment of the invention.

A third embodiment of the system of the invention, designated 300 and illustrated in FIG. 7, comprises the elements and features of the system 100 or system 200 according to respectively the first or second embodiment, mutatis mutandis, with some differences, as disclosed herein. Thus, system 300 comprises optical device 140 with markers 150, and microprocessor device 160, as disclosed above mutatis mutandis. The relative dispositions of the markers 150 with respect to its coordinate system MCS is known, for example via a mapping procedure previously carried out, as already disclosed for other embodiments, mutatis mutandis.

In system 300, rather than a single camera, a camera head 320 is provided comprising a pair of cameras 120A, 120B are provided, similar to camera 120 of the first or second embodiments, but which are mechanically or rigidly coupled in the camera head so that the relative disposition of the fields of view of the two cameras with respect to one another is in a fixed relationship.

Furthermore, the object O is mounted on a fixture 380 rigidly coupled to the free end of a robotic arm 350 for enabling the position (spatial position and/or orientation) $P_j$ of the object O to be selectively changed within object space S. Targets 210 are provided on the object O and/or the fixture 380, similar to that described for the second embodiment, mutatis mutandis, and the relative dispositions of the targets 210 with respect to its coordinate system TCS is known, for example via a mapping procedure previously carried out, as already disclosed for other embodiments, mutatis mutandis.

In this embodiment, the optical head 140 is also mounted onto a robotic arm 360, rather than onto a movable frame, that enables the optical device 140 to be translated and/or rotated so as to direct the field of view of the optical device 140 in any desired direction, and thus enable any part of the object O to be scanned thereby. However, in variations of the third embodiment, one or both of the optical head 140 and the object O may instead each be mounted onto a respective movable frame, or a gantry, or may be hand held, for example, enabling any desired relative position with respect to the object O to be attained.

By way of example, each robotic arm may comprise the robotic arm "Sigma", "Flex" or "Omega", of "Romer", or a robot as manufactured by Fanuc or ABB, for example.

Thus the position $P_i$ of the optical device 140 and the position $P_j$ of the object within space S are independently changeable.

In this embodiment, the two cameras 120A, 120B are fixed in position. However, in alternative variations of this embodiment, it is also possible to move the pair of cameras to a different position (or to have another such pair of cameras at a different position), and thus combine this with the second embodiment, mutatis mutandis.

Camera 120A is set in a position such that its field of view FOV includes at least a portion of space S including all desired positions $P_i$ of the optical device 140 therein, and is particularly configured for acquiring a 2D electronic image of the markers 150 in their relative dispositions within the object space S, as they appear from the location of the camera 120A. The camera 120A is operatively connected to the microprocessor device 160, which is configured to detect and identify the markers 150 in such an electronic 2D image, and to determine the position (i.e., spatial position and/or orientation) of the markers coordinate system, MCS with respect to the coordinate system $CCS_A$ of the camera 120A, and thus of optical device 140, in a similar manner to that disclosed for the first embodiment, mutatis mutandis.

On the other hand, camera 120B has a field of view FOV that includes at least a portion of space S including all desired positions of the object O therein, and is particularly configured for acquiring a 2D electronic image of the targets 210 in their relative dispositions within the object space S, as they appear from the location of the camera 120B, i.e., from its viewpoint. The camera 120B is also operatively connected to the microprocessor device 160, which is also configured to detect and identify the targets 210 in such an electronic 2D image, and to determine the position (i.e., spatial position and/or orientation) of the target coordinate system, TCS with respect to the coordinate system $CCS_B$ of camera 120B, and thus of object O.

The coordinate systems $CCS_A$ and $CCS_B$ of the two cameras 120A, 120B, respectively, are related via transformation matrix G, since the cameras are rigidly coupled to one another.

Figure 8:
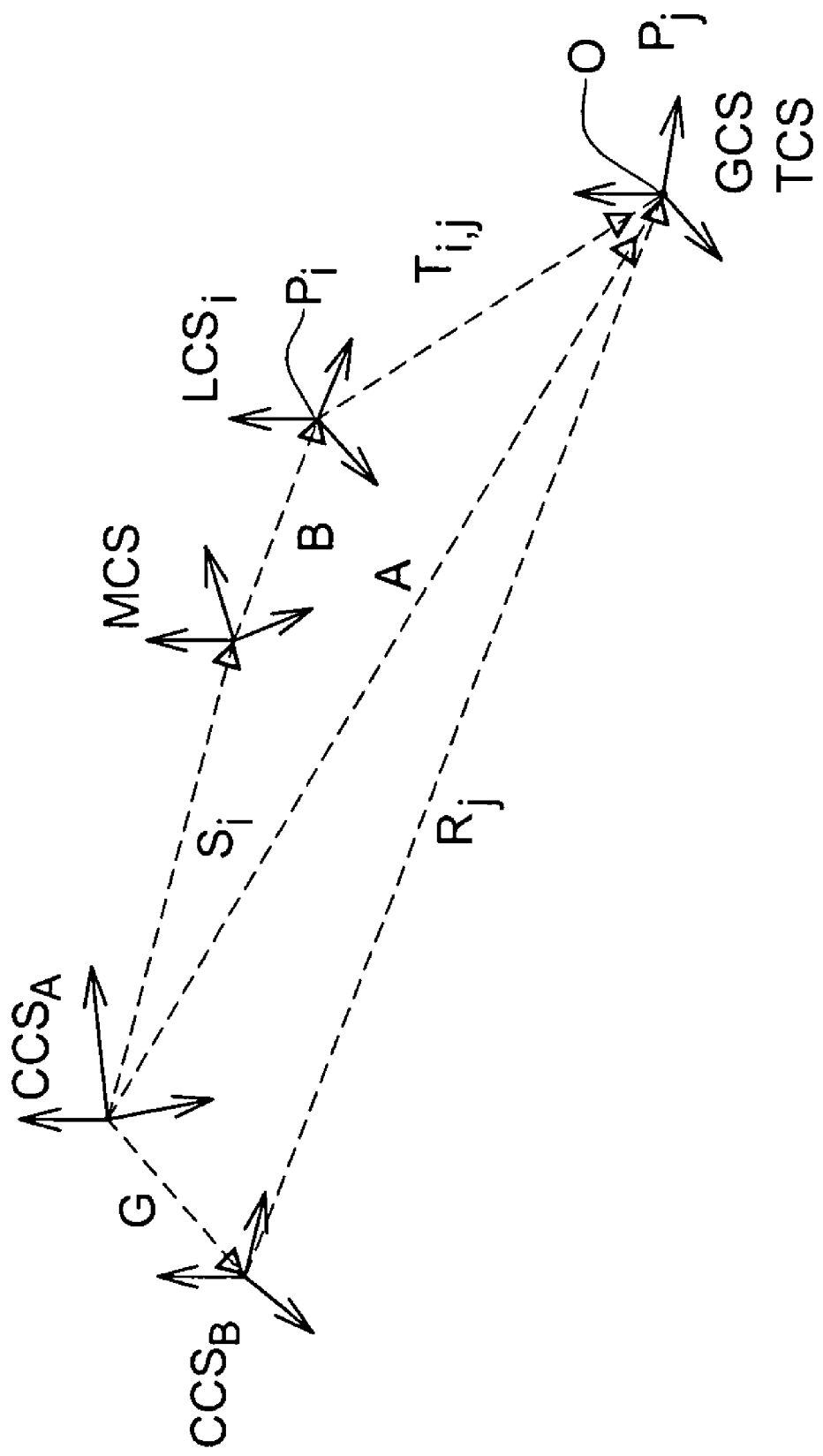
FIG. 8 schematically illustrates spatial relationships between various coordinate systems of the embodiment of FIG. 7.
Figure 9:
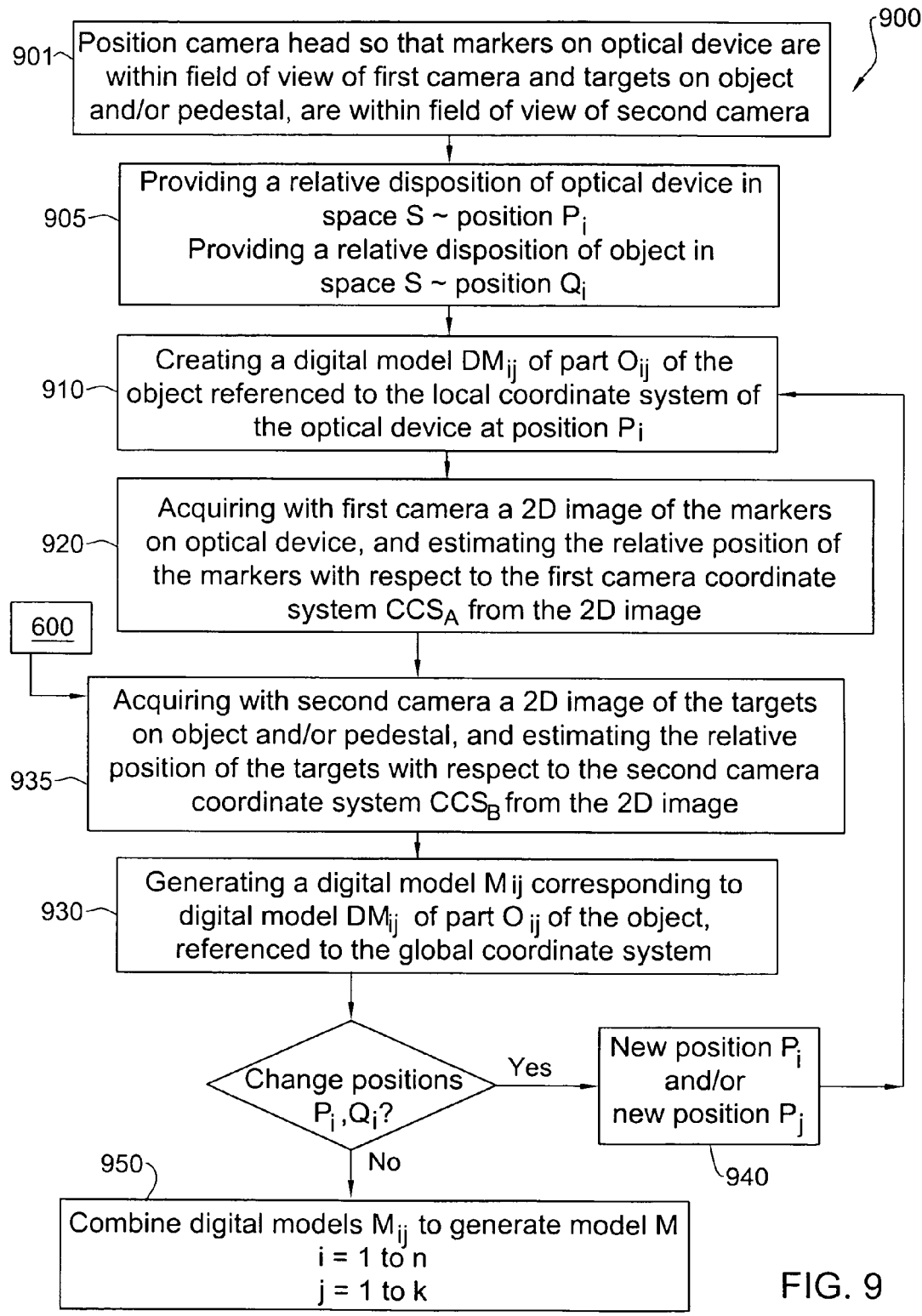
FIG. 9 illustrates a method for providing a digital model according to a third embodiment of the invention.

Referring also to FIG. 8 and FIG. 9, the system 300 operates according to method 900 for obtaining, i.e. reconstructing the surface topology of the object O with respect to a global coordinate system GCS, as follows. In step 905, optical device 140 and object O are placed in position $P_i$ and position $P_j$, respectively, within space S so that a portion $O_{i,j}$ of the surface of the object O is within the field of view of the optical device 140 and may be scanned by it, and such that the targets 210 are within the field of view of camera 120B, while markers 150 are within the field of view of camera 120A.

Then, in step 910, the topology of this portion $O_{i,j}$ is reconstructed by the optical device 140, in a similar manner to step 710 of the first embodiment, mutatis mutandis, generating a digital model $DM_{ij}$, which is referenced to a corresponding local coordinate system $LCS_i$ with respect to the optical device 140.

In a similar manner to step 720 of the embodiment of FIG. 2, mutatis mutandis, in step 920 of method 900, the camera 120A acquires a 2D electronic image $E_i$ of the optical device 140, in particular the markers 150 thereon, in its position $P_i$, and microprocessor device 160 determines the position of the markers 150 with respect to the camera coordinate system $CCS_A$, generating a transformation matrix $S_i$ defining the relationship between the 3D coordinate system $CCS_A$ of camera 120A and the coordinate system MCS of the markers 150.

In a similar manner to step 835 of the embodiment of FIG. 5, mutatis mutandis, in step 935 of method 900, the camera 120B acquires a 2D electronic image $E_j$ of the targets 210, with the object O in position $P_j$, and microprocessor device 160 determines the position of the targets 210 with respect to the camera coordinate system $CCS_B$, generating a transformation matrix $R_j$ defining the relationship between the 3D coordinate system $CCS_B$ of camera 120B and the coordinate system TCS of the targets 210 at position $P_j$. In this embodiment, the target coordinate system TCS defines the global coordinate system GCS of the object O.

In step 930, the digital model $DM_{ij}$ is converted to transformed digital model $M_{ij}$, which is referenced to the global coordinate system GCS, by means of the following transformation relationship:

$$A = T_i * B * S_i \qquad (4)$$

wherein:

A is the transformation matrix between the 3D coordinate system of camera 120A and the global coordinate system GCS;

B is the transformation matrix between the 3D coordinate system MCS of markers 150 and the local coordinate system $LCS_i$;

$T_{ij}$ is the transformation matrix for converting the coordinates of the digital model $DM_{ij}$ from the local coordinate system $LCS_i$ to the global coordinate system GCS, to provide transformed digital model $M_{ij}$;

$S_i$ is the aforesaid transformation matrix between the 3D coordinate system CCS of camera 120A and the coordinate system MCS of the markers 150.

In contrast to the embodiment of FIG. 2, matrix A is not a constant, but depends on the position $P_j$ of the object O, and is related as follows to matrices $R_j$ and G:

$$A = R_j * G \quad (5)$$

wherein:

$R_j$ is the transformation matrix between the 3D coordinate system of camera 120B and the global coordinate system GCS; and G is the aforesaid transformation matrix between the 3D coordinate system $CCS_A$ of camera 120A and the 3D coordinate system $CCS_B$ of camera 120B.

Thus, transformation matrix $T_{ij}$ may be applied to the digital model $DM_{ij}$ to convert it to provide digital model $M_{ij}$ of portion $O_{ij}$ of the object O, referenced to the global coordinate system GCS, and the transformation matrix $T_{ij}$ is thus provided by the relationship:

$$T_{ij} = R_j * G * (S_i)^{-1} * (B)^{-1} \quad (6)$$

wherein $(S_i)^{-1}$ and $(B)^{-1}$ are the inverse matrices corresponding to matrices $S_i$ and B, respectively.

$R_j$ and $S_i$ are obtained in steps 935 and 920, respectively, for a given set of positions $P_j$ and $P_i$, and matrices G and B are determined in a calibration procedure similar to calibration procedure 650 or 650', mutatis mutandis, in which the object O is replaced with calibration object CO having targets 159, and $T_{ij}$ may be determined directly for a given set of positions $P_i$ and $P_j$ when the optical device 140 scans the calibration object CO, since relative position of the targets 159 with respect to one another is known (for example via a mapping procedure). At the same time, though, for the same set of positions $P_i$ and $P_j$, matrix $R_j$ is also determined directly, by taking a 2D image of the targets 159 and determining the relationship between the coordinate system of the targets 159 and camera coordinate system $CCS_B$ of camera 120B. In at lest some variations of this embodiment, rather than replacing object O with calibration object CO, the calibration procedures may instead be carried out with respect to targets 210 in a similar manner to similar to calibration procedure 650 or 650', mutatis mutandis, but with respect to targets 210.

Thus, manipulating relationship (6):

$$(R_j)^{-1} * T_{ij} * B = G * (S_i)^{-1} \quad (7)$$

and matrices B and G may be found by solving (7) for a plurality of sets of $R_j$ and $T_{ij}$, obtained for a respective plurality of sets of positions $P_i$, $P_j$ with the calibration object CO.

In step 940, the optical device 140 is moved to a different position $P_i$ and/or the object O is moved to a different position $P_j$ so that a different portion $O_{ij}$ thereof is within the field of view of the optical device 140, and steps 920, 935 and 930 are repeated at this new set of positions, so that a digital model of this portion is generated, referenced to the global coordinate system GCS.

Step 940 can be repeated as many times as desired, each time choosing a different portion of the object O, whether or not it overlaps with other such portions of the object O, and generating each time a respective digital model thereof referenced to the global coordinate system GCS, until the entire object O is scanned, or a desired part thereof.

In step 950, the various digital models $M_{ij}$ that were generated corresponding to respective portions $O_i$ of the object O, can be combined in a straightforward manner without further transformations being applied to the digital models $M_i$, to provide digital model M of the entire object O, or the aforesaid desired part thereof, since the digital models $M_i$ are all referenced to the same, global coordinate system GCS.

In the method claims that follow, alphanumeric characters and Roman numerals used to designate claim steps are provided for convenience only and do not necessarily imply any particular order of performing the steps.

Finally, it should be noted that the word "comprising" as used throughout the appended claims is to be interpreted to mean "including but not limited to".

While there has been shown and disclosed example embodiments in accordance with the invention, it will be appreciated that many changes may be made therein without departing from the spirit of the invention.

The invention claimed is:

1. A method for providing a digital model of at least a part of an object referenced to a global coordinate system, comprising, for the or each said part: (a) providing an initial digital model representative of the respective part using an optical device at a respective relative location with respect to said object, wherein said initial digital model is referenced to a local coordinate system associated with said optical device, and wherein said optical device comprises a plurality of visually exposed optical markers, said markers being located at known locations with respect to said optical device referenced to a marker coordinate system; (b) determining said location of the optical device in step (a) with respect to an external camera arrangement, based on relating the relative locations of said markers with respect to one another, as they appear from a viewpoint of said external camera arrangement, to the relative locations of respective said markers with respect to one another as referenced to said marker coordinate system, and wherein said viewpoint is at a known location referenced to said global coordinate system; and (c) generating a transformed digital model representative of the respective part and referenced to said global coordinate system, based on modifying said initial digital model according to said determined location.

2. Method according to claim 1, comprising (d) repeating steps (a) to (c) a plurality of times, wherein each said time said optical device is at a different said respective relative location with respect to said object and a respective modified digital model being generated of a respective said part of said object, thereby generating a corresponding plurality of said modified digital models, and (e) combining said modified digital models thus generated into a unified digital model.

3. Method according to claim 1, wherein a camera coordinate system is associated with said camera arrangement corresponding to said viewpoint when said optical device is at said respective relative location with respect to said object.

4. Method according to claim 3, wherein in step (c), a transformation matrix $T_i$ is applied to said initial digital model, wherein said transformation matrix $T_i$ is configured for converting coordinates of said digital model from the local coordinate system to coordinates referenced to said global coordinate system, to provide said transformed digital model, wherein said transformation matrix $T_i$ is obtained from transformation relationship:

$$A = T_i * B * S_i$$

wherein:
A is a known transformation matrix between the camera coordinate system and the global coordinate system;
B is a known transformation matrix between the markers coordinate system and the local coordinate system;
$S_i$ is a transformation matrix between the camera coordinate system and the marker coordinate system, determined based on said determination of said location in step (b).

5. Method according to claim 4, wherein matrix A is determined based on one of (i) said known location of said viewpoint with respect to said global coordinate system, and (ii) on executing a calibration procedure applied to a calibration object.

6. Method according to claim 4, wherein matrix B is determined via a calibration procedure applied to a calibration object.

7. Method according to claim 4, wherein in step (b) said camera arrangement provides at least one electronic 2D image of said markers with respect to a camera coordinate system, and obtaining said relative locations of said markers with respect to one another as they appear from said viewpoint from said 2D image, and determining said transformation matrix Si correlated to at least one of a geometrical rotation and a geometrical translation required to be applied to said locations of said markers referenced to said marker coordinate system to provide relative locations between said markers that match the relative locations of corresponding said markers as defined by said 2D image according to preset criteria.

8. Method according to claim 1, further comprising step (d) of defining at least one new, known location for said viewpoint with respect to said global coordinate system, and repeating steps (a) to (c) at least one time at said new location to generate each time a respective modified digital model of a respective said part of said object corresponding to said new location of said viewpoint, and combining said modified digital models into a unified digital model referenced to the same coordinate system.

9. Method according to claim 8, comprising repeating said step of defining for each of a plurality of different said new known locations for said viewpoint with respect to said global coordinate system, and combining said modified digital models into a unified digital model referenced to the same coordinate system.

10. Method according to claim 8, further comprising providing a plurality of visually exposed optical targets located in fixed spatial relationship with said object at known locations with reference to a target coordinate system.

11. Method according to claim 10, wherein at least one group of said targets is viewed by said camera arrangement at each said location of said viewpoint thereof, and further comprising determining a spatial relationship between the target coordinate system and the external camera arrangement at each said location of said respective viewpoint, based on relating the relative locations of said group of targets with respect to one another, as they appear from the respective viewpoint of said external camera arrangement, with the relative locations of respective said targets with respect to one another as referenced to said target coordinate system.

12. Method according to claim 11, wherein said modified digital models associated with respective different said viewpoints are combined based on said determined spatial relationships between the target coordinate system and the respective external camera arrangement at the respective said respective viewpoint.

13. Method according to claim 10, wherein said optical device further provides the location of at least one group of said targets at each said viewpoint thereof referenced to the respective said local coordinate system, and based on the location, providing a spatial relationship between the target coordinate system and the local coordinate system at each said respective viewpoint.

14. Method according to claim 13, wherein said modified digital models associated with respective different said viewpoints are combined based on said spatial relationships between the target coordinate system and the respective the local coordinate systems.

15. Method according to claim 1, wherein said camera arrangement comprises at least one first camera defining said viewpoint and at least one second camera rigidly coupled thereto, and further comprising providing a plurality of visually exposed optical targets located in fixed spatial relationship with said object at known locations with reference to a target coordinate system, wherein said targets are within a field of view of said second camera.

16. Method according to claim 15, further comprising determining a spatial relationship between the target coordinate system and said second camera, based on relating the relative locations of said targets with respect to one another, as they appear with respect to said second camera, with the relative locations of respective said targets with respect to one another as referenced to said target coordinate system.

17. Method according to claim 16, wherein at least one said respective relative location of said optical device with respect to said object is provided by independently moving said object and said optical device.

18. Method according to claim 17, wherein each one of said object and said optical device is independently moved with respect to multiple degrees of freedom.

19. Method according to claim 16, comprising repeating steps (a) to (c) at least two times, wherein each said time at least one of said object and said optical device is moved so that said optical device is at a different said respective relative location with respect to said object and a respective modified digital model being generated of a respective said part of said object, and combining said modified digital models thus generated into a unified digital model.

20. Method according to claim 16, wherein in step (c), a transformation matrix $T_{ij}$ is applied to said digital model, wherein said transformation matrix $T_{ij}$ is configured for converting surface coordinates of said digital model from the local coordinate system to coordinates referenced to said global coordinate system, to provide said transformed digital model, wherein said transformation matrix $T_{ij}$ is obtained from transformation relationship:

$$T_{ij} = {}^*G^*(S_i)^{-1*}(B)^{-1}$$

wherein:
G is a known transformation matrix between a first camera coordinate system associated with said first camera and a second camera coordinate system associated with said second camera;
B is a known transformation matrix between the markers coordinate system and the local coordinate system;
$R_j$ is a transformation matrix between the second camera coordinate system and the target coordinate system, determined in step (b), corresponding to the location of the object;
$S_i$ is a transformation matrix between the first camera coordinate system and the marker coordinate system, determined in step (b), corresponding to the location of the optical device.

21. A system for providing a digital model of at least a part of an object referenced to a global coordinate system, comprising: (a) an optical device configured for providing a digital model representative of the respective part at a respective relative location with respect to said object, said first digital model being referenced to a local coordinate system associated with said optical device, and wherein said optical device comprises a plurality of visually exposed optical markers, said markers being located at known locations with respect to said optical device referenced to a marker coordinate system; (b) an external camera arrangement configured for determining a location of the optical device with respect to said external camera arrangement, based on relating the relative locations of said markers with respect to one another, as they appear from a viewpoint of said external camera arrangement, with the relative locations of respective said markers with respect to one another as referenced to said marker coordinate system, and wherein said viewpoint is at a known location referenced to said global coordinate system; and (c) microprocessor device configured for generating a transformed digital model representative of the respective part and referenced to said global coordinate system, based on modifying said first digital model according to said determined location.

22. System according to claim 21, wherein said camera arrangement is movable to provide at least one new viewpoint therefore.

23. System according to claim 21, wherein at least one of said optical device and said object are movable with respect to said camera arrangement.

24. System according to claim 23, wherein said camera arrangement comprises at least one first camera defining said viewpoint and at least one second camera rigidly coupled thereto, and further comprising a plurality of visually exposed optical targets located in fixed spatial relationship with said object at known locations with reference to a target coordinate system, wherein said targets are within a field of view of said second camera.

* * * * *

UNITED STATES PATENT AND TRADEMARK OFFICE
CERTIFICATE OF CORRECTION

PATENT NO. : 8,265,376 B2  
APPLICATION NO. : 12/318383  
DATED : September 11, 2012  
INVENTOR(S) : Nir Tsuk et al.

Page 1 of 1

It is certified that error appears in the above-identified patent and that said Letters Patent is hereby corrected as shown below:

In the Claims:

Column 24, Claim 20, Lines 50-53

Please delete

"from transformation relationship:
$T_{ij}=*G*(S_i)^{-1*}(B)^{-1}$
wherein:"

and replace with

-- "from transformation relationship:
$T_{ij}=R_j*G*(S_i)^{-1*}(B)^{-1}$
wherein:" --

Signed and Sealed this  
Twenty-third Day of April, 2013

Teresa Stanek Rea  
*Acting Director of the United States Patent and Trademark Office*